United States Patent
Wu et al.

(10) Patent No.: US 9,576,201 B2
(45) Date of Patent: Feb. 21, 2017

(54) METHOD AND APPARATUS FOR CLASSIFYING PIXELS IN AN INPUT IMAGE AND IMAGE PROCESSING SYSTEM

(71) Applicant: CANON KABUSHIKI KAISHA, Tokyo (JP)

(72) Inventors: Bo Wu, Beijing (CN); Yong Jiang, Beijing (CN); You Lv, Beijing (CN); Xingwei Xu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 14/338,127

(22) Filed: Jul. 22, 2014

(65) Prior Publication Data
US 2015/0030255 A1  Jan. 29, 2015

(30) Foreign Application Priority Data
Jul. 25, 2013 (CN) .......................... 2013 1 0316961

(51) Int. Cl.
G06K 9/62 (2006.01)
G06K 9/00 (2006.01)

(52) U.S. Cl.
CPC ........... *G06K 9/00664* (2013.01); *G06K 9/628* (2013.01); *G06K 9/6292* (2013.01)

(58) Field of Classification Search
None
See application file for complete search history.

(56) References Cited

U.S. PATENT DOCUMENTS

| | | | |
|---|---|---|---|
| 2005/0220336 A1* | 10/2005 | Sabe | G06K 9/00248 382/159 |
| 2010/0226566 A1* | 9/2010 | Luo | G06K 9/34 382/164 |
| 2014/0270350 A1* | 9/2014 | Rodriguez-Serrano | G06K 9/6217 382/103 |
| 2014/0294239 A1* | 10/2014 | Duckett | G06K 9/6228 382/103 |

OTHER PUBLICATIONS

Superpixel Tracking. Shu Wang, Huchuan Lu, Fan Yang, and Ming-Hsuan Yang. Aug. 2011.*

(Continued)

*Primary Examiner* — Stephen R Koziol
*Assistant Examiner* — Delomia L Gilliard
(74) *Attorney, Agent, or Firm* — Canon U.S.A., Inc. IP Division

(57) ABSTRACT

The present disclosure relates to a method and apparatus for classifying pixels in an input image and image processing system. The apparatus includes a first confidence determination unit configured for determining a first confidence of each of the pixels in the input image belonging to each of a plurality of predetermined classes; a detection unit configured for acquiring, by using a detector for detecting a particular class among the plurality of predetermined classes, detection results used to indicate pixels which belong to the particular class; an updating unit configured for updating the first confidences according to the detection results; and a class determination unit configured for determining the class to which each of the pixels in the input image belongs among the plurality of predetermined classes, according to the updated first confidences.

20 Claims, 12 Drawing Sheets

(56) References Cited

OTHER PUBLICATIONS

Dorin Comaniciu, Peter Meer, Mean Shift: A Robust Approach Toward Feature Space Analysis, IEEE Transactions on IEEE Pattern Analysis and Machine Intelligence, May 2002, 24(5):603-619, IEEE, Piscataway NJ, 2002.
Pedro F. Felzenszwalb, Daniel P. Huttenlocher, Efficient Graph-Based Image Segmentation, International Journal of Computer Vision, Sep. 2004.
Radhakrishna Achanta, Appu Shaji, Kevin Smith, Aurélien Lucchi, Pascal Fua, Sabine Süsstrunk, SLIC Superpixels, EPFL Technical Report No. 149300, Jun. 2010, École Polytechnique Fédérale de Lausanne, Lausanne, CH, 2010.
Carsten Rother, Vladimir Kolmogorov, Andrew Blake, "GrabCut": Interactive Foreground Extraction using Iterated Graph Cuts, Aug. 2004.
Yann Lecun, Leon Bottou, Genevieve B. Orr, Klaus-Robert Muller, Efficient Backprop, 1998.

* cited by examiner

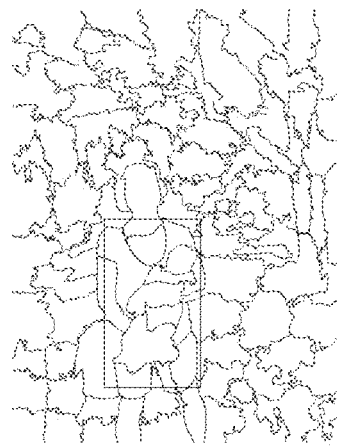
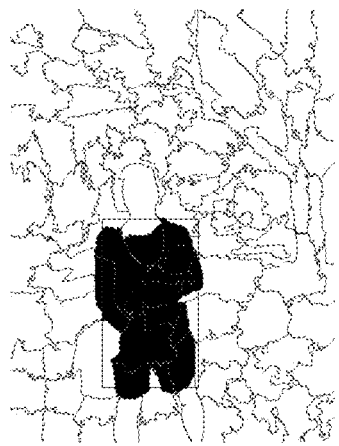
Fig. 4A          Fig. 4B
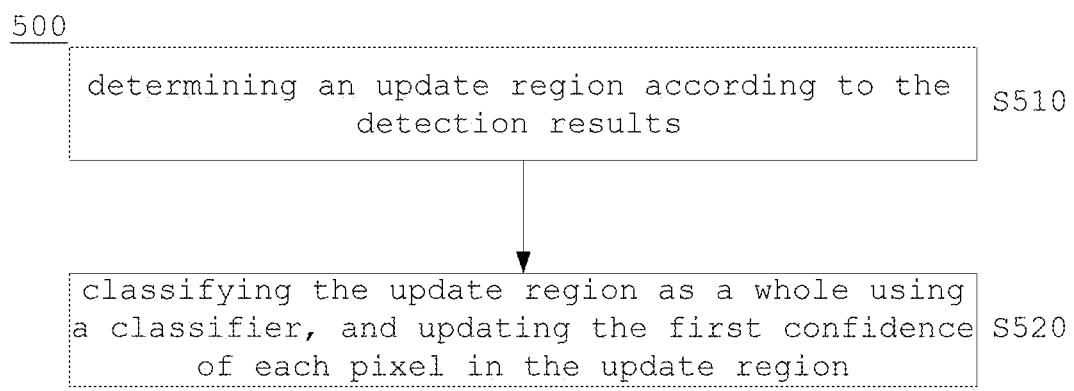
Fig. 5

METHOD AND APPARATUS FOR CLASSIFYING PIXELS IN AN INPUT IMAGE AND IMAGE PROCESSING SYSTEM

CROSS REFERENCE TO RELATED APPLICATION

This application claims the benefit of Chinese Application No. 201310316961.9, filed Jul. 25, 2013. Chinese Application No. 201310316961.9 is herein incorporated by reference in its entirety.

BACKGROUND OF THE INVENTION

Field of the Invention

The present invention relates to a field of image processing, and more specifically, to a method and apparatus for classifying pixels in an input image and image processing system.

Description of the Related Art

Segmenting an entire image into distinct recognizable regions is a central challenge in computer vision, which has received increasing attention in recent years. Unlike object recognition methods which can find a particular object, multi-class image segmentation methods can classify all pixels in an image, and then concurrently recognize multi-class objects based on the classification. If an image is intended to be segmented accurately with each pixel belonging to the class it actually belongs to, each pixel in the image need to be correctly classified into one of several predetermined classes.

Usually, the multi-class segmentation method is based on either pixel or "super-pixel". For a pixel based method, local features within the neighbourhood of each pixel are extracted, and the pixel is classified mainly according to the extracted features. For a super-pixel based method, the processing procedures are similar to the pixel based method, with treating each super-pixel obtained by performing over-segment on an input image as a pixel used in the pixel based method. That is, in the super-pixel based method, the input image is first over-segmented into some super-pixels, and then local features within the super-pixels are extracted to be used for classifying corresponding super-pixel.

Take the super-pixel based method as an example. In such a method, a multi-class classifier can be used to classify each super-pixel into different predetermined classes according to the extracted features of the super-pixel. For each super-pixel, the multi-class classifier calculates a confidence of the super-pixel belonging to each predetermined class. Then, the super-pixel is classified into a class corresponding to the maximum within the confidence of the super-pixel among all the predetermined classes.

For example, when segmenting an image composed of grass, a human, trees, sky and mountain in order to recognize multi-class objects, the expected output is that each pixel in this image is classified into its real class which is consisted of a "grass" class, a "human" class, a "tree" class, a "sky" class and a "mountain" class. That is, in the ideal resulted image, the true class label will be assigned to each pixel.

In the above image, all the objects can be divided into two sets. One set is "things" which includes the "human" class, and the other set is "stuff" which includes the "grass" class, the "tree" class, the "sky" class and the "mountain" class. The "thing" usually has a distinct size and shape, which may also include other prominent objects such as cars, pedestrians, bicycles, and houses. The "stuff" is a homogeneous or reoccurring pattern of fine-scale properties, but has no specific spatial extent or shape, which may also include other objects such as a road. The distinction between the two sets can also be interpreted in terms of localization. Specifically, the "thing" can be easily localized by a bounding box that can limit the region where the "thing" appears, but the "stuff" cannot.

Since a "stuff" object has a pattern in fine scale, its pattern can usually be captured by its local features and it can be recognized correctly. However, as for a "thing" object, larger scale information is needed to recognize it correctly. The local features within a limited sight cannot recognize it correctly. For example, in the an image, if one of the super-pixels (represented as super-pixel 1) gotten by an over-segmentation method is a skirt region (the skirt region may have a same color and present a textural property) belonging to the human object that should be classified into the "human" class, and another super-pixel (represented as super-pixel 2) appears within a grassland that should be classified into the "grass" class, when the local features extracted in each super-pixel are used by the multi-class classifier, it may be hard for the multi-class classifier to differentiate the super-pixel 1 from the super-pixel 2 because the two super-pixels may have similar local features.

Therefore, with the conventional multi-class segmentation methods, it is often difficult to differentiate some "thing" objects from "stuff" objects, and a poor performance of classification is presented. Some pixels in an image may be wrongly classified into an inaccurate class, and thus deteriorating multi-class segmentation.

SUMMARY OF THE INVENTION

The embodiments of the present invention provide a method and apparatus for classifying pixels in an input image and image processing system, which are capable of performing better classification on pixels to prevent improper multi-class segmentation, and thus improving the classification performance.

In one aspect of the present invention, an apparatus for classifying pixels in an input image is provided. The apparatus comprises: a first confidence determination unit configured for determining a first confidence of each of pixels in the input image belonging to each of a plurality of predetermined classes; a detection unit configured for acquiring, by using a detector for detecting a particular class among the plurality of predetermined classes, detection results used to indicate pixels which belong to the particular class; an updating unit configured for updating the first confidences according to the detection results; and a class determination unit configured for determining the class to which each of the pixels in the input image belongs among the plurality of predetermined classes, according to the updated first confidences.

In another aspect of the present invention, an image processing system is provided. The image processing system comprises the above described apparatus.

In yet another aspect of the present invention, a method for classifying pixels in an input image is provided. The method comprises: determining a first confidence of each of pixels in the input image belonging to each of a plurality of predetermined classes; acquiring, by using a detector for detecting a particular class among the plurality of predetermined classes, detection results used to indicate pixels which belong to the particular class; updating the first confidences according to the detection results; and determining the class to which each of the pixels in the input image belongs among the plurality of predetermined classes, according to the updated first confidences.

According to the solutions as described above, by updating the first confidences according to detection results acquired by a detector aiming at a particular class, the first confidences of pixels can be further influenced and modified by the detection results of the detector. With consideration of more information based on the detection results to calculate the confidences of the pixels, the pixels can be better classified into their respective real class. Thus, better classification on pixels can be performed to prevent improper multi-class segmentation, and the classification performance can be improved.

Further characteristic features and advantages of the present invention will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are diagrams showing an example of a bounding box acquired from a detector and pixels whose first confidences need to be updated according to the bounding box, respectively.

FIG. 5 is a flowchart showing another method for performing the updating step in FIG. 2 according to an embodiment of the present invention.

DESCRIPTION OF THE EMBODIMENTS

Figure 1:
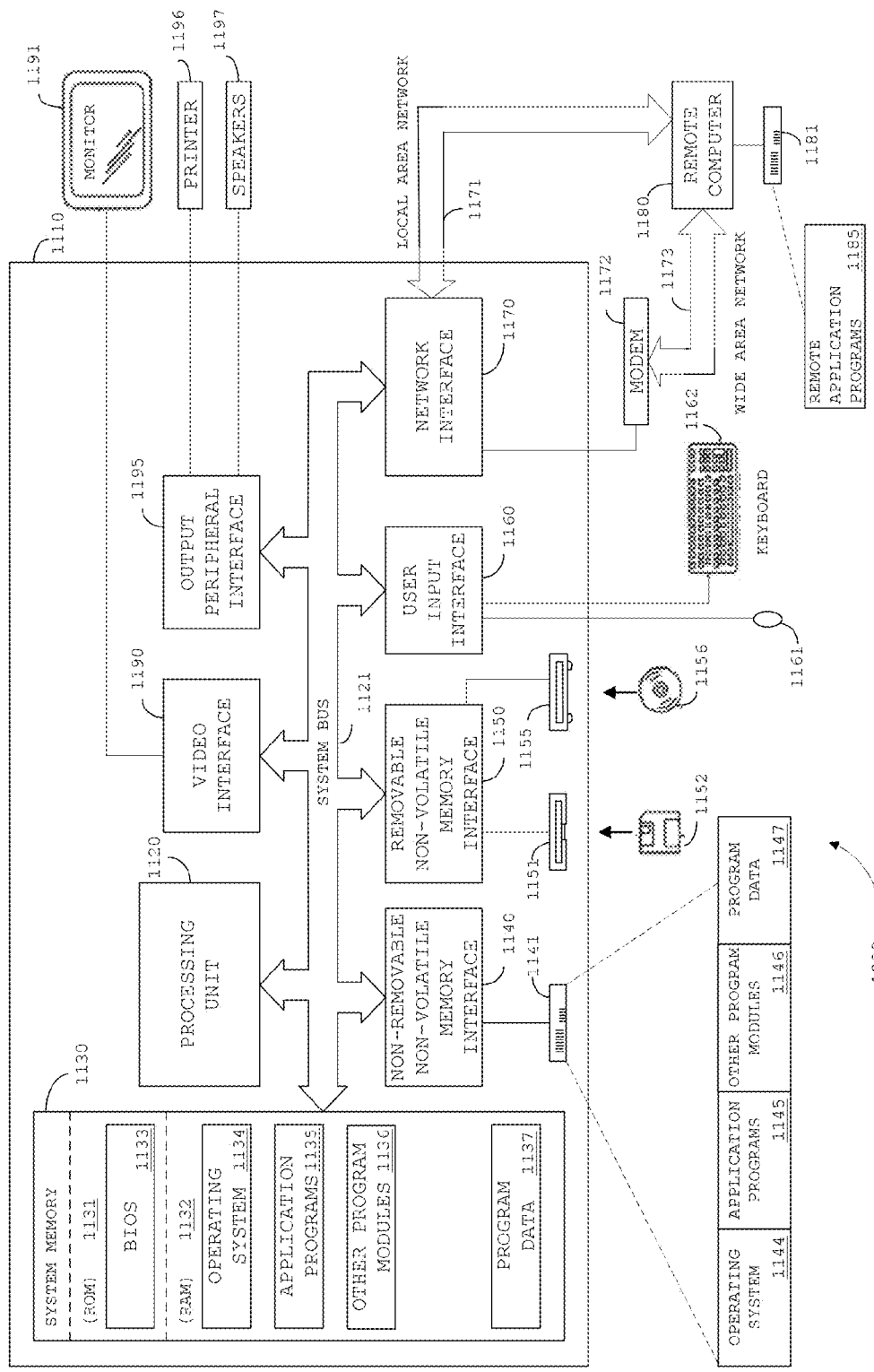
FIG. 1 is a block diagram showing an exemplary hardware configuration of a computer system which can implement the embodiments of the present invention.

Embodiments of the present invention will be described in detail below with reference to the drawings.

Please note that similar reference numerals and letters refer to similar items in the figures, and thus once an item is defined in one figure, it need not be discussed for following figures.

In the present disclosure, the terms "first", "second" and the like are only used to discriminate between elements or steps, but are not intended to indicate a temporal order, a preference or an importance.

FIG. 1 is a block diagram showing a hardware configuration of a computer system 1000 which can implement the embodiments of the present invention.

As shown in FIG. 1, the computer system comprises a computer 1110. The computer 1110 comprises a processing unit 1120, a system memory 1130, non-removable non-volatile memory interface 1140, removable non-volatile memory interface 1150, user input interface 1160, network interface 1170, video interface 1190 and output peripheral interface 1195, which are connected via a system bus 1121.

The system memory 1130 comprises ROM (read-only memory) 1131 and RAM (random access memory) 1132. A BIOS (basic input output system) 1133 resides in the ROM 1131. An operating system 1134, application programs 1135, other program modules 1136 and some program data 1137 reside in the RAM 1132.

A non-removable non-volatile memory 1141, such as a hard disk, is connected to the non-removable non-volatile memory interface 1140. The non-removable non-volatile memory 1141 can store an operating system 1144, application programs 1145, other program modules 1146 and some program data 1147, for example.

Removable non-volatile memories, such as a floppy drive 1151 and a CD-ROM drive 1155, are connected to the removable non-volatile memory interface 1150. For example, a floppy disk 1152 can be inserted into the floppy drive 1151, and a CD (compact disk) 1156 can be inserted into the CD-ROM drive 1155.

Input devices, such a mouse 1161 and a keyboard 1162, are connected to the user input interface 1160.

The computer 1110 can be connected to a remote computer 1180 by the network interface 1170. For example, the network interface 1170 can be connected to the remote computer 1180 via a local area network 1171. Alternatively, the network interface 1170 can be connected to a modem (modulator-demodulator) 1172, and the modem 1172 is connected to the remote computer 1180 via a wide area network 1173.

The remote computer 1180 may comprise a memory 1181, such as a hard disk, which stores remote application programs 1185.

The video interface 1190 is connected to a monitor 1191.

The output peripheral interface 1195 is connected to a printer 1196 and speakers 1197.

The computer system shown in FIG. 1 is merely illustrative and is in no way intended to limit the invention, its application, or uses.

The computer system shown in FIG. 1 may be implemented to any of the embodiments, either as a stand-alone computer, or as a processing system in an apparatus, possibly with one or more unnecessary components removed or with one or more additional components added.

Next, a method 200 for classifying pixels in an input image will be described with reference to FIG. 2.

Figure 2:
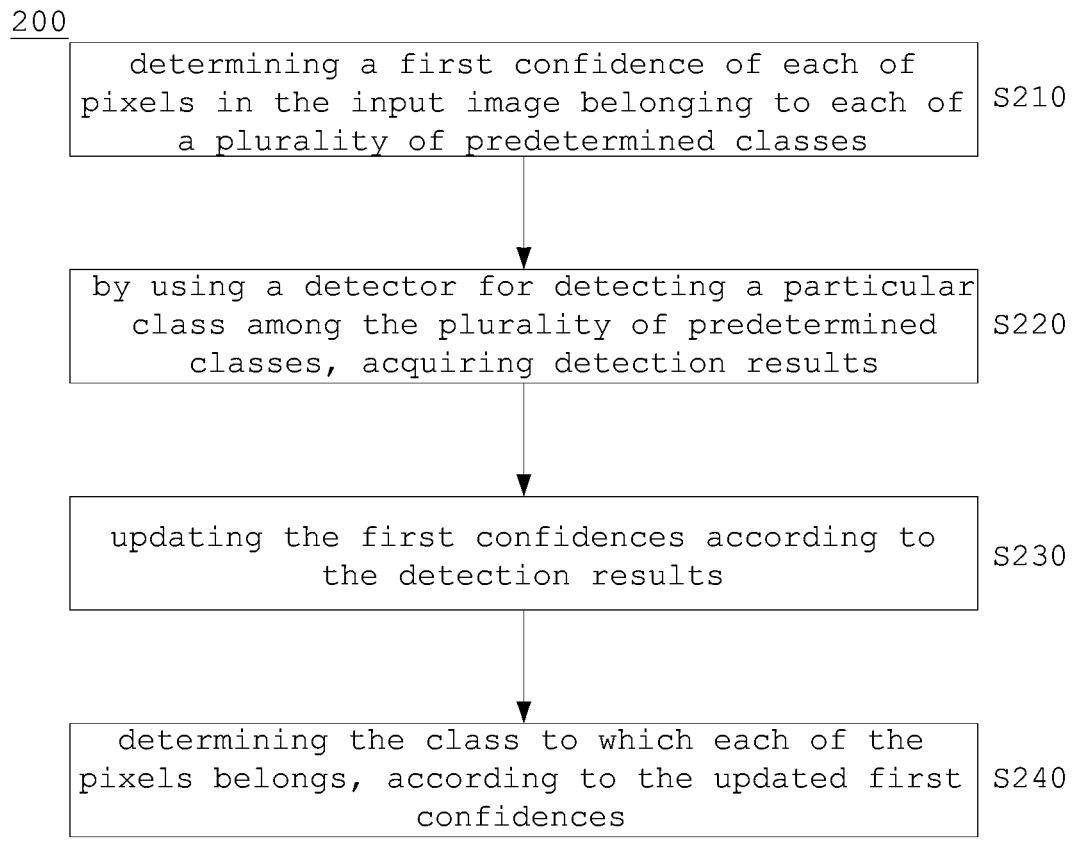
FIG. 2 is a flowchart showing a method for classifying pixels in an input image according to an embodiment of the present invention.

As shown in FIG. 2, the method 200 may comprises a first confidence determination step S210, a detection step S220, an updating step S230, and a class determination step S240. In the first confidence determination step S210, a first confidence of each of pixels in the input image belonging to each of a plurality of predetermined classes may be determined. In the detection step S220, by using a detector for detecting a particular class among the plurality of predetermined classes, detection results used to indicate pixels which belong to the particular class may be acquired. In the updating step S230, the first confidences may be updated according to the detection results. In the class determination step S240, the class to which each of the pixels in the input image belongs among the plurality of predetermined classes may be determined, according to the updated first confidences.

More specifically, several predetermined classes can be predefined in advance to substantially identify the objects that are likely to appear in certain kinds of images. For example, as for any input image generated by taking a picture of a human, these input images may contain objects each of which can be determined as belonging to one of a "human" class, a "building" class, a "sky" class, a "water" class, a "tree" class, and a "nature" class. Therefore, each pixel in the above input images can be classified into one of the above six classes, and these classes can be regarded as predetermined classes which can substantially identify objects that are possibly occurred in such a kind of input images.

A machine or electronic device cannot know the real class each pixel actually belongs to, and can merely calculate a probability that a pixel belongs to each predetermined class. A confidence of a pixel may indicate a probability that the pixel belongs to each predetermined class, and may be represented by a vector including N components (N is an integer larger than 1), with each component corresponding to a probability of the pixel belonging to one class in N predetermined classes. There are many ways to compute the first confidence of each pixel in the step S210, including the above-described pixel-based method and super-pixel based method. For example, using a conventional multi-class classifier, the first confidence of each pixel can be determined. Continuing with the above example, a multi-class classifier which can only identify the above six classes, may determine that a probability of a certain pixel belonging to the "human" class is 0.5, a probability of the pixel belonging to the "building" class is 0.1, a probability of the pixel belonging to the "sky" class is 0.15, a probability of the pixel belonging to the "water" class is 0.08, a probability of the pixel belonging to the "tree" class is 0.02, and a probability of the pixel belonging to the "nature" class is 0.15. All of the above six probabilities constitute the first confidence of the pixel determined in the step S210.

Further, according to an embodiment of the present invention, the first confidence of each pixel can be determined by an improved classifier which will be described in detailed below.

The detector used in the step S220 can detect a particular class among the predetermined classes. Usually, the particular class is related to a "thing". Any existing object detector such as the human detector, the animal detector, and so on can be used here. With the object detector, it can detect where a target object is located in the input image. The output of the detector may be a bounding box that points to a target object which belongs to the particular class the detector can detect, or may also be some other forms to indicate where pixels belonging to the particular class are located. From the detector, pixels belonging to the particular class can be identified.

According to an embodiment of the present invention, the detection step S220 may comprise a first detection sub-step and a first determination sub-step. In the first detection sub-step, a plurality of image regions including the pixels which belong to the particular class in the input image may be detected by using the detector. In the first determination sub-step, a region generated by grouping the plurality of image regions may be determined as the detecting results.

More specifically, an input image can be divided into a set of image regions with different positions and sizes. Then, using a specific object detector, each of all the image regions can be detected to determine whether the image region has the specific object or not. After that, the image regions which have the specific object and occupy similar positions can be grouped into one unique region as the bounding region (or bounding box).

According to an embodiment of the present invention, the detection step S220 may comprise a second detection sub-step and a second determination sub-step. In the second detection sub-step, in a case that the particular class is a human class, a face region in the input image may be detected by using the detector being a face detector. In the second determination sub-step, a region generated by enlarging the face region may be determined as the detection results.

For example, if an input image contains a human, an arbitrary existing face detector can be used to detect where a face is located, and a face box may be put on the input image to indicate the position of the face. Then, by enlarging the face box with empirical values, a bounding box to define the region that the human may appear can be determined. For example, as for a human, if his/her face box is detected with a dimension of w*w, the face box may be enlarged by extending the dimension by 0.5w upward, 5w downward, 1.5w leftward, and 1.5w rightward, and thus a bounding box can be obtained with a dimension of 4w*6.5w. The region limited by the bounding box may be used as the detection results.

In addition, if an input image has several persons in it, using a face detector, each face in the input image can be detected. Then, by enlarging each face box, several bounding boxes may be obtained, and thus the positions where the human bodies are located can be identified.

Using the detection results from the detector, the first confidences may be updated in the step S230.

There are several ways to update the first confidences. For example, the first confidences may be updated by using a probability that a pixel to be updated belongs to a foreground of the input image. The first confidences may also be updated by using an improved classifier described later to calculate the confidences again. The first confidences may further be updated by using both the above probability and the improved classifier. Next, specific description will be made about how to update the first confidences.

Figure 3:
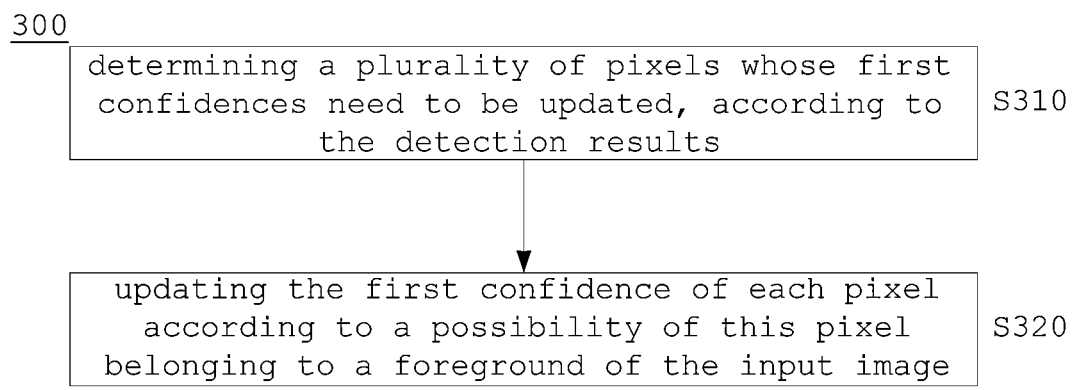
FIG. 3 is a flowchart showing a method for performing an updating step in FIG. 2 according to an embodiment of the present invention.

According to an embodiment of the present invention, as shown in a method 300 of FIG. 3, the updating step S230 may include an update pixel determination sub-step S310 and a first updating sub-step S320.

In the update pixel determination sub-step S310, a plurality of pixels whose first confidences need to be updated may be determined, according to the detection results.

In this step, pixels included in super-pixels covered by a region formed of the pixels which belong to the particular class may be determined as the pixels whose first confidences need to be updated.

As is well known, a confidence of a pixel can be determined according to a confidence of a super-pixel where the pixel is located. For example, a confidence of a pixel is equal to a confidence of a super-pixel where the pixel is located.

The super-pixels can be obtained after performing over-segmentation on the input image, with each super-pixel contains a plurality of pixels. Using several well-known over-segmentation methods, an image can be segmented into a plurality of super-pixels. For example, the following methods can be used to segment an image into many super-pixels: the mean-shift method which is described in the Document 1 (Document 1: D. Comaniciu and P. Meer, "Mean shift: a robust approach toward feature space analysis", IEEE PAMI, 24(5):603-619, May 2002), the Felzenszwalb method which is described in the Document 2 (Document 2: P. Felzenszwalb and D. Huttenlocher, "Efficient Graph-Based Image Segmentation", IJCV, Vol. 59, No. 2, September 2004.), the SLIC method which is described in the Document 3 (Document 3: R. Achanta, A. Shaji, K. Smith, A. Lucchi, P. Fua, and S. Susstrunk, "SLIC Super-pixels", EPFL Technical Report no. 149300, June 2010), and so on.

According to an embodiment of the present invention, the super-pixels covered by the region formed of the pixels which belong to the particular class may include a super-pixel which has a ratio larger than a first predetermined threshold, wherein the ratio is equal to the number of this super-pixel's pixels overlapped with the region formed of the pixels which belong to the particular class divided by the total number of this super-pixel's pixels. For example, the first predetermined threshold may be 50%, 60%, and other percentage, and thus if the most part of a super-pixel is cover by the region based on the detection results, the first confidences of the pixels in this super-pixel will be subjected to being updated.

For example, as shown in FIG. 4A, it shows a bounding box the detector outputs, which may indicate pixels belonging to a particular class that the detector can detect. As shown in FIG. 4B, super-pixels covered by a bounding region limited by the bounding box are highlighted with a dark color, and the first confidences of the pixels in these super-pixels will be updated in the first updating sub-step S320.

In the first updating sub-step S320, for each of the plurality of pixels, the first confidence of the pixel may be updated according to a probability of this pixel belonging to a foreground of the input image.

For example, several binary segmentation algorithms may provide a confidence or probability of each pixel belonging to a foreground of an input image. For example, the Grab Cut algorithm can model the foreground color distribution as a Gaussian mixture model (GMM) p(x), wherein x is the pixel RGB color. This p(x) can be considered as a confidence of a pixel belonging to the foreground. Since the foreground may often include a particular object that the detector for the particular class can detect, the foreground may correspond to the particular class. Then, a confidence of the pixel belonging to each of other predetermined classes except the particular one can be regarded as being equal to each other, and the sum of the confidences of the pixel belonging to all the classes is equal to 1.

More specifically, as for a pixel, the confidence of the pixel belonging to the particular class of the foreground is p(x). The confidence of the pixel belonging to each of other predetermined classes can be represented as follows:

$$C_k = (1 - p(x))/(K-1)$$

Wherein, k is a label that does not point to the particular class among the predetermined classes, and K is the number of the predetermined classes.

According to an embodiment of the present invention, in a case that a confidence of a pixel is obtained based on a confidence of a super-pixel where it is located, the first updating sub-step may comprise a second confidence determination sub-step and a updating sub-step. In the second confidence determination sub-step, for each of the super-pixels covered by the region formed of the pixels which belong to the particular class, a second confidence of the super-pixel belonging to each of the plurality of predetermined classes may be determined according to the probabilities of the pixels included in the super-pixel belonging to the foreground of the input image. In the updating sub-step, for each of the super-pixels covered by the region formed of the pixels which belong to the particular class, the first confidences of the pixels included in the super-pixel may be updated according to the second confidence of the super-pixel.

For example, for each super-pixel covered by the region formed of the pixels which belong to the particular class, the second confidence of the super-pixel belonging to the particular class is equal to an average value of the probability of each pixel included in the super-pixel belonging to the foreground of the input image. The second confidence of the super-pixel belonging to each of other predetermined classes is equal to an average value of a probability of each pixel included in the super-pixel belonging to the corresponding one of the other predetermined classes, wherein the probability of the pixel belonging to each of the other predetermined classes is equal to (1−the probability of the pixel belonging to the foreground of the input image)/(the number of the plurality of predetermined classes−1).

More specifically, when the confidence or probability of each pixel in a super-pixel covered by the region formed of the pixels which belong to the particular class is calculated as above, the confidences of the pixels within the super-pixel can be averaged, so as to obtain the second confidence of the super-pixel as follows:

$$\overline{C} = \frac{1}{|S|} \sum_{i \in S} C(i)$$

Wherein, |S| is the pixel number of a super-pixel S, C(i) is the confidence (vector) of each pixel i in the super-pixel S.

According to an embodiment of the present invention, for each of the pixels included in the super-pixel, the first confidence of the pixel may be updated by linearly combining the second confidence of the super-pixel with the first confidence of the pixel.

The linear combination of these two kinds of confidences may be represented as follows:

$$C=\lambda *C^s+(1-\lambda)*C^m$$

Wherein, $C^s$ is the second confidence (which may be also called a segmentation confidence herein) of a super-pixel covered by the region based on the detection results (such as the region within the bounding box in FIG. 4B), $C^m$ is the first confidence (which may be also called a model confidence when obtained from a classifier) of a pixel in the super-pixel, and C is the updated first confidence of this pixel. Note that, each of $C^s$ and $C^m$ is a vector which contains K elements, with each element corresponding to one of the K predetermined classes. $\lambda$ is a combination ratio or a weight ranged from 0 to 1. The general rule for setting this ratio is to choose a high value if the object detection result is reliable. For example, in the case of using the face detection algorithm to obtain a bounding region of a human body, since the face detection is reliable, $\lambda$ can be set to be a relatively high constant, such as 0.9.

According to an embodiment of the present invention, the updating step S230 may be performed by classifying an update region which is based on the detection results as a whole with a classifier. As shown in a method 500 of FIG. 5, the update step S230 may comprise an update region acquisition sub-step S510 and a second updating sub-step S520.

In the update region acquisition sub-step S510, an update region within a region formed of the pixels which belong to the particular class may be determined according to the detection results.

For example, an update region may be an extracted foreground region from a bounding box detected by the detector, by using binary foreground/background segmentation algorithms. There are many binary foreground/background segmentation algorithms being able to determine a foreground region in an input image. For example, the Grab Cut algorithm can be used to determine a foreground region, which is described in a document entitled "GrabCut" by C. Rother, V. Kolmogorov, and A. Blake, and published in SIGGRAPH, 309-314 on 2004. Since the Grab Cut algorithm only requires inputting an initial rectangle which can be provided naturally by a bounding box which may be generated in the detection step S220, this algorithm can be regarded as an ideal algorithm to determine a foreground region in an embodiment of the present invention. However, persons skilled in the art can easily conceive of other algorithms to determine a foreground region, such as an existing Snake segmentation method. Note that, with the Grab Cut algorithm and the Snake segmentation method, not only the foreground region can be extracted, but also a probability of a pixel belonging to the foreground can be determined.

Figures 6A, 6B, 6C:
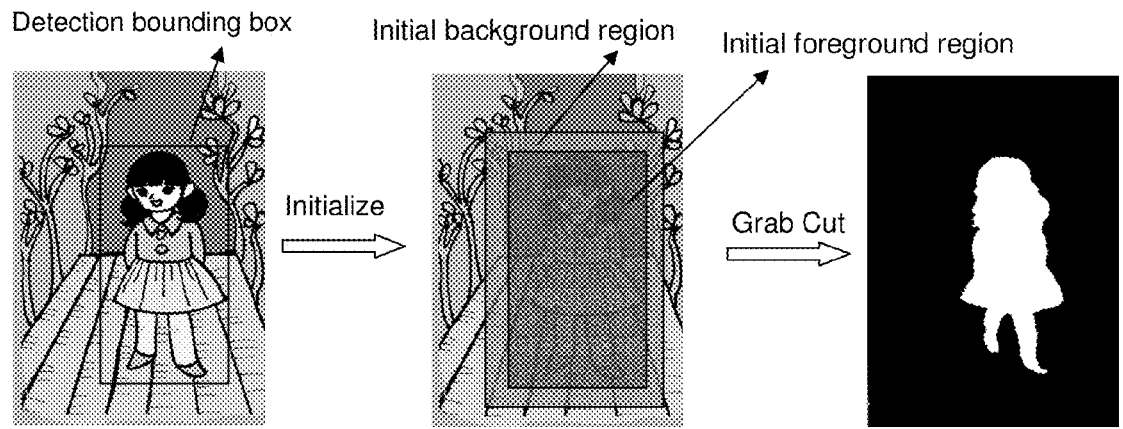
FIGS. 6A to 6C are diagrams showing an example of a bounding box, background and foreground initialization, and extracted foreground region, respectively.

As shown in FIG. 6A, a bounding box may be provided on an input image for example by using an existing human detector. Then, as shown in FIG. 6B, an image patch within the bounding box may be initialized as a foreground region, and a 5-pixel width strip surrounding it may be chosen as an initial background region. After that, as shown in FIG. 6C, by using the Grab Cut algorithm, a further foreground region can be extracted. The further foreground region shown in FIG. 6C can be determined as the update region, which need to be grouped as a whole to be classified by a classifier.

In the second updating sub-step S520, the update region as a whole may be classified using a classifier and the first confidence of each pixel in the update region may be updated according to an output of the classifier.

For example, the classifier may be a multi-class classifier based on super-pixels. When the classifier determines a confidence of a super-pixel, a confidence of a pixel included in this super-pixel can also be determined, for example the two are equal to each other.

Another example, the classifier may be an improved classifier, which is trained based on a grouping super-pixel obtained by grouping in advance super-pixels belonging to a same class among a plurality of super-pixels into which a training image is segmented, as well as un-grouped super-pixels.

This step may use the improved classifier to determine the updated first confidences for pixels in the update region. The operation of the classifier is substantially the same as that of the conventional classifiers, except the classifier used in this step is trained in a different way to have its corresponding parameters. When the classifier is trained, firstly, some super-pixels belonging to a same class is grouped to be a grouping super-pixel. Then, the grouping super-pixel and the remaining un-grouped super-pixel are used for calculating parameters of the classifier, rather than directly using super-pixels after over-segmentation during the training procedure as in the existing classifier. With the parameters of the classifier and features of each of super-pixels (after some super-pixels are grouped together, these super-pixels are regarded as a whole to be one super-pixel), the classifier can calculate the first confidences of each super-pixel.

The features of each super-pixel used by the classifier may have several forms to include different components. When a classifier is trained by a form of a feature, such a form is also used by the classifier to calculate a confidence. For example, a specific form of features can be used by the improved classifier in order to perform better classification and simplify the components of the features. The specific form will be described in conjunction with the training of the classifier.

Figure 7:
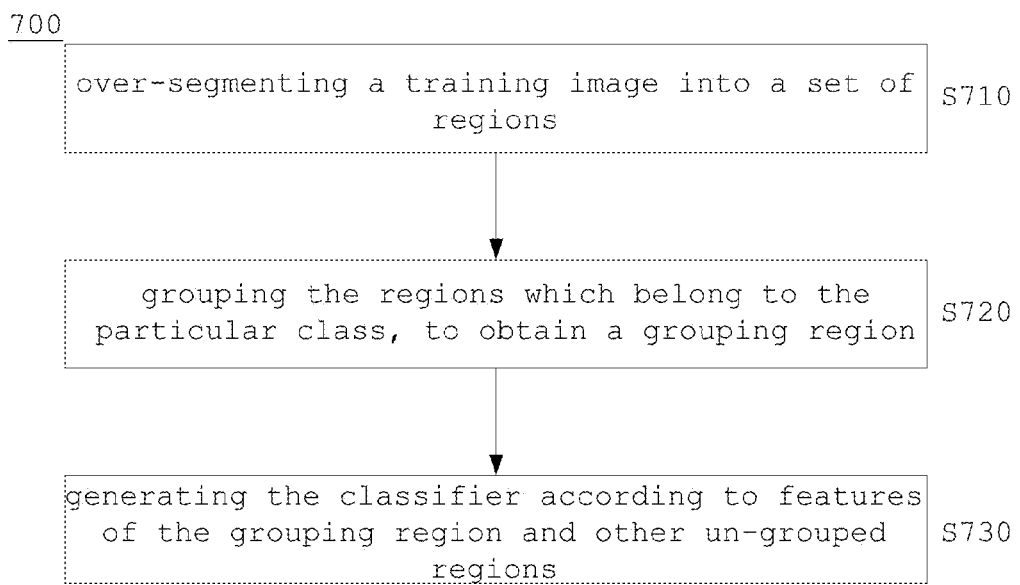
FIG. 7 is a flowchart showing a method for training a multi-class classifier according to an embodiment of the present invention.

According to an embodiment of the present invention, the classifier used in the step S520 may be trained by a method 700 shown in FIG. 7, which comprises an over-segmentation step S710, a grouping step S720 and a generation step S730, with some regions belonging to a particular class grouped beforehand. For example, the improved classifier trained by the method 700 may have a larger sight to recognize an object belonging to a "thing", such as an object belonging to the "human" class.

In the over-segmentation step S710, a training image may be over-segmented into a set of regions.

More specifically, abundant training images can be prepared beforehand. Then, every training image is divided into a plurality of regions (such as, super-pixels) which are used as training samples. Several popular over-segmentation methods such as the methods described in the Documents 1 to 3 can be used to over-segment the training image to get super-pixels. The aspects needed to be considered when choosing a suitable over-segment method mainly include the boundary consistence, the average number of super-pixels per training image, and the implementation speed. Based on the above aspects, the Felzenszwalb method described in the Document 2 can be selected for performing over-segmentation. In the used Felzenszwalb method, the parameter "k" influences the number of super-pixels, and the parameter "min_size" controls the minimum size of super-pixels. The parameters "k" and "min_size" can be set to 150 and 100, respectively.

Figure 8A:
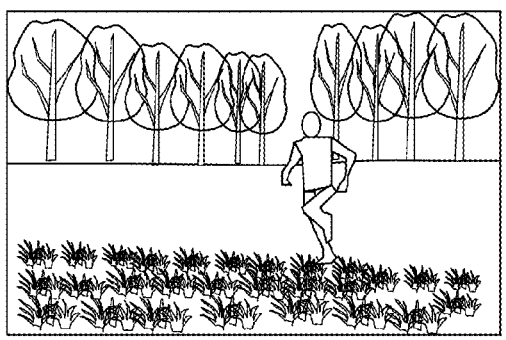
FIGS. 8A to 8D are diagrams schematically showing an example of a training image, a ground truth image, original super-pixels after over-segmentation, and new super-pixels after grouping the super-pixels covered by a human body, respectively.
Figure 8B:
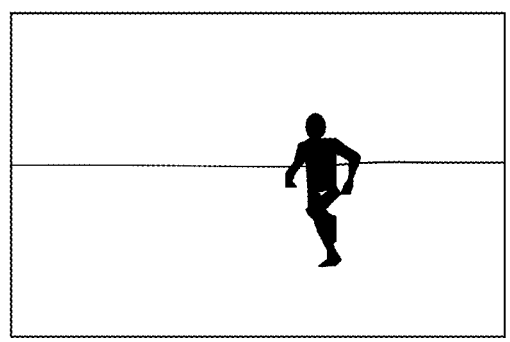
Figure 8C:
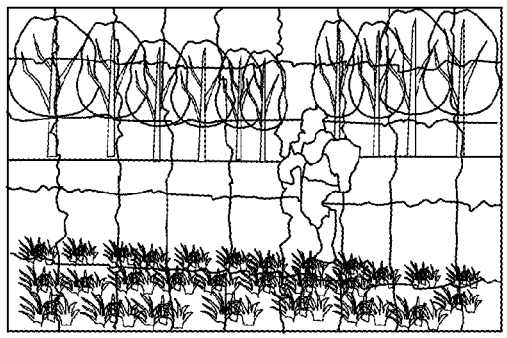

FIG. 8A shows a schematic diagram of an example of a training image, and FIG. 8C shows a schematic diagram of the obtained original super-pixels when the SLIC method is performed with the parameter "count" is equal to 150.

In the grouping step S720, the regions which belong to the particular class may be grouped, to obtain a grouping region.

In this step, as for each training image, a corresponding image with ground truth labels can be provided manually, because the ground truth for the training image is known in the training phase. With the ground truth labels, a marked region belonging to a same class can be identified, such as a marked region that can identify a "thing" object like a human body, animal, and so on.

FIG. 8B shows a schematic diagram of an image with ground truth labels corresponding to the training image shown in FIG. 8A, which is acquired manually. In FIG. 8B, a marked region belonging to a same particular class such as a "human" class can be clearly identified.

After the image with the marked region belonging to the "human" class shown in FIG. 8B and the image with many super-pixels shown in FIG. 8C are compared, the super-pixels covered by the "human" class marked region can be identified. For example, the super-pixels covered by the marked region may include a super-pixel which has a ratio of the number of its pixels overlapped with the marked region to the total number of its pixels larger than a certain predetermined threshold such as 80%. Then, these identified super-pixels are grouped together to generate a grouping super-pixel.

Figure 8D:
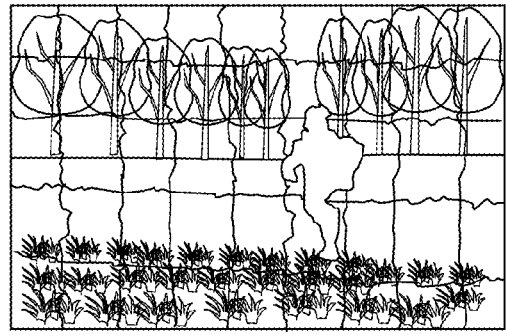

As shown in FIG. 8D, all the connected super-pixels belonging to a same particular class (herein, the "human" class) are grouped together to form a new big super-pixel, and thus new super-pixels after grouping the original super-pixels covered by the "human" class marked region are obtained. In this way, the features associated with the "human" class super-pixels (or samples) contain enough information to recognize a human. By using discriminative features which can describe the whole human body to feed a classifier training algorithm such as an existing classifier training algorithm, an improved classifier can be generated, which is capable of classifying the "thing" object (here, human body) more efficiently.

Persons skilled in the art can understand that there may be more than one marked region which is usually a "thing" object, and then more than one grouping super-pixel can be obtained. Each grouping super-pixel can be assigned with the same class label as that of the connected original super-pixels within it. For example, if a grouping super-pixel is generated by grouping super-pixels belonging to the "human" class, then, the grouping super-pixel also belongs to the "human" class.

Even though FIG. 8B to FIG. 8D use super-pixels as the regions in the step S710, the regions in the steps S710 can be other forms of pixel sets, which may depend on different over-segmentation algorithm.

In the generation step S730, the improved classifier may be generated according to features of the grouping region and other un-grouped regions.

In this step, local features for every region (such as, super-pixel) including the grouping region and other un-grouped regions after the grouping step S720 can be extracted. Simple features such as intensity, color, and filter response are available. Other complicated features such as the local binary pattern (LBP), and histogram and statistics of simple features can also be involved. The introduction of the LBP can be found in the above document entitled "GrabCut" by C. Rother, V. Kolmogorov, and A. Blake, and published in SIGGRAPH, 309-314 on 2004.

In the experiments performed by the Inventors, a 69-dimension feature vector is built for each region (here, super-pixel). Note that, the grouping region is regarded as a single region.

Table 1 shows the extracted features for each super-pixel, with each element included in the features having its own definition to represent a component or a part of a component.

TABLE 1

| Extracted features for each super-pixel | Dimension |
|---|---|
| Color | |
| mean RGB | 3 |
| Geometry | |
| Area | 1 |
| second moment of X coordinate | 1 |
| second moment of Y coordinate | 1 |
| second mixed moment of X and Y coordinate | 1 |
| Location | |
| x position of region center | 1 |
| y position of region center | 1 |
| distance from region center to image center | 1 |
| LBP | |
| uniform LBP on grayscale | 59 |
| Total dimension | 69 |

Specifically, the mean RGB is the average RGB color over the super-pixel.

The area is the ratio of pixel number of the super-pixel to that of the image, which may be represented as follows:

$$\text{Area} = \frac{m}{w*h}$$

Wherein, m is the pixel number of the super-pixel, and w and h are width and height of the image, respectively.

The second moment of X coordinate is the variance of the X-coordinates of pixels included in the super-pixel, which may be represented as follows:

$$\frac{1}{m}\sum_{i=1}^{m}(X_i - \mu_x)^2$$

Wherein, m is the number of pixels included in the super-pixel, $X_i$ is the X-coordinate of the i-th pixel included in the super-pixel, and $$\mu_x = \sum_{i=1}^{m} X_i$$

is the average X-coordinate of all the pixels included in the super-pixel.

The second moment of Y coordinate is the variance of Y-coordinates of pixels included in the super-pixel, where may be represented as follows:

$$\frac{1}{m}\sum_{i=1}^{m}(Y_i - \mu_y)^2$$

Wherein, m is the number of pixels included in the super-pixel, Yi is the Y-coordinate of the i-th pixel included in the super-pixel, and $$\mu_y = \sum_{i=1}^{m} Y_i$$

is the average Y-coordinate of all the pixels included in the super-pixel.

The second mixed moment of X and Y coordinate is the covariance of X and Y-coordinates, which may be represented as follows, with each element having the same meaning as above:

$$\frac{1}{m}\sum_{i=1}^{m}(X_i - \mu_x)(Y_i - \mu_y)$$

Figure 9A:
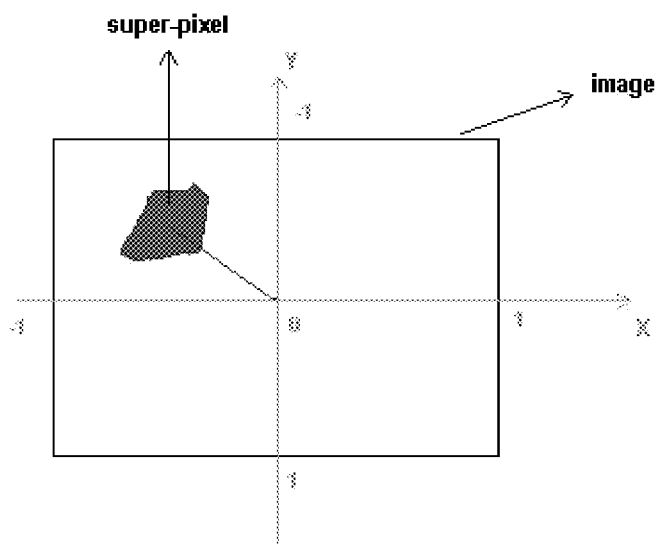
FIG. 9A is a diagram showing an example of determination of a location feature.

In order to compute the "Location" feature, a coordinate system as shown in FIG. 9A is built. In the coordinate system, the original (0, 0) is the image center, and both X and Y coordinates are normalized to be within a range of [−1, 1]. As for a super-pixel represented with a dark color, the x position of the region center of this super-pixel is the average X-coordinate of all the pixels in this super-pixel under such a coordinate system. The y position of the region center of this super-pixel is the average Y-coordinate of all the pixels in this super-pixel under such a coordinate system. The distance from the region center of this super-pixel to the image center is the length from the region center to the image center.

The uniform LBP may be calculated in the following manner. Firstly, any pixel in a super-pixel can be observed in a window with a size of 3 pixels*3 pixels, with this pixel being located in the center of this window. In the window, the gray value of the central pixel is compared with the gray values of its 8 neighbor pixels. If the gray value of a neighbor pixel is larger than the gray value of the central pixel, the central pixel is labeled with 1 correspondingly to this neighbor pixel; otherwise, the central pixel is labeled with 0 correspondingly to this neighbor pixel.

Figure 9B:
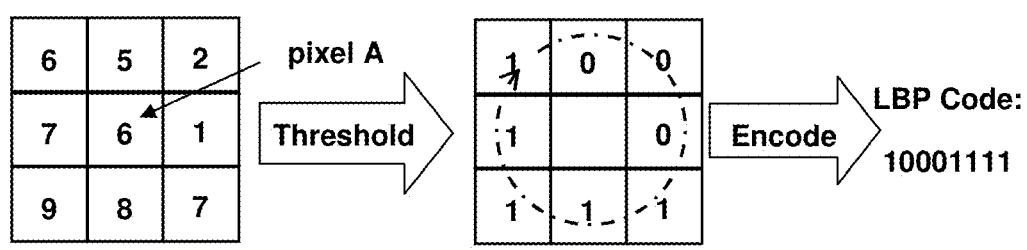
FIG. 9B is a diagram showing an example of determination of a LBP code.

For example, as shown in FIG. 9B, when it is intended to determine the LBP code of a pixel A, a window with a size of 3 pixels*3 pixels is put on the pixel A, with the pixel A being the central pixel. In the left portion of FIG. 9B, the pixel A has an intensity of gray value 6, and its neighbor pixels have an intensity of gray values 6, 5, 2, 1, 7, 8, 9, and 7, respectively. If the pixel A does not have 8 neighbor pixels (for example, the pixel A is located at the upper right corner of the image), the lacked neighbor pixels can be set to an intensity of a gray value that is equal to the gray value of the pixel A, or can be set to an intensity of a gray value 0, or can be set to an intensity of other gray value to make the pixel A have completed 8 neighbor pixels.

Then, the gray values of its 8 neighbor pixels are compared with a threshold which is equal to the gray value 6 of the pixel A. If the gray value of a neighbor pixel is larger than the threshold 6, this neighbor pixel can be encoded into 1 at a corresponding position in the LBP code of the pixel A; otherwise, this neighbor pixel can be encoded into 0 at a corresponding position in the LBP code.

As shown in the right portion of FIG. 9B, each neighbor pixel of the pixel A is encoded into 0 or 1, and then the LBP code corresponding to the pixel A can be obtained by reading the codes of neighbor pixels sequentially. In this example, the pixel A can be encoded into 10001111. With the above encoding method, each pixel can be encoded into a LBP code.

Certain local binary patterns (LBP codes) are fundamental properties of texture, providing the vast majority (sometimes over 90%) of all 3*3 patterns present in the observed texture. These fundamental patterns can be called as "uniform" pattern. As for a certain-length LBP code, with uniform patterns, most of all the possible LBP codes can be included, with other LBP codes being regarded as belonging to another pattern. The uniform patterns can be classified based on the number of spatial transitions in one LBP code. For example, if a bit in an LBP code is 0 and its next bit (if a bit is the last bit in an LBP code, its next bit is the first bit in the LBP code) in the LBP code is 1, there is one spatial transition. If a bit in a LBP code is 1 and its next bit in the LBP code is 0, there is one spatial transition. It may be designed that the uniform patterns are formed with the number of spatial transitions no larger than 2.

More specifically, in the above 8-bit LBP codes, there are total 59 patterns, with 58 uniform patterns and 1 pattern including remaining LBP codes that cannot be classified into the uniform patterns. In the 58 uniform patterns, 2 uniform patterns (2 LBP codes: 00000000 and 11111111) have the number of spatial transitions being 0, and 56 uniform patterns (56 LBP codes: 10000000, 10000001, 10000011 have the number of spatial transitions being 2.

With the 58 uniform patterns and 1 pattern including remaining LBP codes, all the LBP codes in a super-pixel can be classified into one pattern among the total 59 patterns. Therefore, a histogram with the patterns being the horizontal axis and the number of LBP codes being the vertical axis can be acquired for a super-pixel. By using the height value of the histogram, a 59-bit uniform LBP code for a super-pixel can be obtained.

After the features of all the super-pixels are obtained, a classifier model can be trained to generate a multi-class classifier. There are many available methods for building the classifier model, such as neural network, the SVM and trees, etc. In an embodiment of the present invention, a classifier can be trained with any existing classifier training method, except that the features used to train the classifier may be different, which may include the features of a grouping super-pixel. Here, a forward neural network with a hidden layer is selected for building a classifier for example, and the node number of the output layer is the same as the number of predetermined classes that the classifier can identify.

Figure 10:
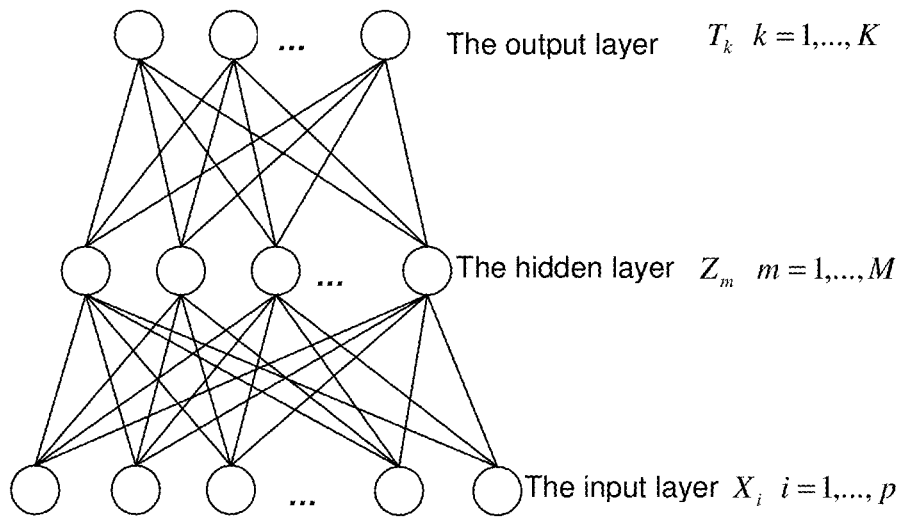
FIG. 10 is a diagram showing a structure of a neural network model used by a multi-class classifier.

The structure of the neural network model is shown in FIG. 10. The feature Xi of each super-pixel is inputted into the input layer. For example, if the feature has a form shown in Table 1, there are 59 nodes in the input layer, with each node receive one element of the feature, and p is equal to 59.

Derived features Zm in the hidden layer may be created from linear combination of input features Xi, and may be represented as follows:

$$Z_m = f(\alpha_{0m} + \alpha_m^T X), m=1, \ldots, M,$$

Wherein, $X=(X_1, X_2, \ldots, X_p)$, $\alpha_{0m}$ and $\alpha_m$ are parameters used by the function $f()$ which can produce Zm, and M is the number of nodes in the hidden layer. The function $f(\ )$ may be a sigmoid activation function as follows:

$$f(t) = \frac{1}{1+\exp(-t)}$$

Then, the output Tk is modeled as a function of linear combinations of the Zm, and can be represented as follows:

$$T_k = \beta_{0k} + \beta_k^T Z, k=1, \ldots, K,$$

wherein $Z=(Z_1, Z_2, \ldots, Z_M)$, $\beta_{0k}$ and $\beta_k$ are parameters used to produce Tk, and K is the number of nodes in the output layer which is equal to the number of predetermined classes that the classifier can perform classification.

Let $\alpha=\{\alpha_{00}, \alpha_0, \alpha_{01}, \alpha_1 \ldots \alpha_{0M}, \alpha_M\}$ and $\beta=\{\beta_{00}, \beta_0, \beta_{01}, \beta_1 \ldots \beta_{0K}, \alpha_K\}$. $\theta=\{\alpha, \beta\}$ is a model parameter to be learned in the training phase.

The Softmax function below is applied to transform the outputs Tk to confidence values within the interval of [0, 1].

$$C_k = \frac{\exp(T_k)}{\sum_{i=1}^{K} \exp(T_l)}, k=1, 2, \ldots, K$$

Wherein, $C_k$ stands for the confidence of the super-pixel belonging to the predetermined class k. Obviously, the total confidence of each super-pixel is equal to 1, which means that $$\sum_{k=1}^{K} C_k = 1$$

Suppose that there are N training samples (N super-pixels, including marked grouping super-pixels and other un-grouped super-pixels). The extracted features are $x_i$, i=1, . . . , N, respectively. The ground truth class labels (predetermined classes) are $g_i \in \{1, 2, \ldots, K\}$. Then, a cross entropy error (CEE) loss is defined as follows:

$$L(\theta) = -\sum_{i=1}^{N} \log(c_{g_i}(x_i, \theta))$$

Wherein, $c_{g_i}(x_i, \theta)$ is the confidence of sample $x_i$ belonging to class $g_i$ calculated by the neural network model with the model parameter $\theta$.

The training course is to find the optimal $\theta^*$ which minimizes the loss $L(\theta)$.

$$\theta^* = \arg\min_{\theta} L(\theta)$$

Figure 11:
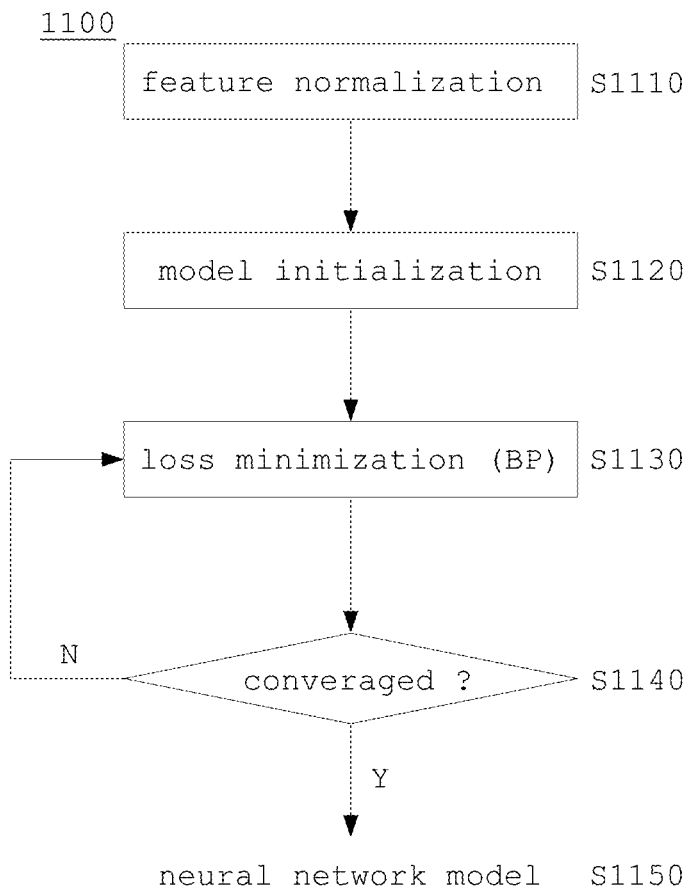
FIG. 11 is a flowchart showing an exemplary method for performing the backpropagation algorithm.

This optimization problem is often solved by the back-propagation (BP) algorithm iteratively performed as shown in a method 1100 of FIG. 11. The BP algorithm is described in a document entitled "Efficient backprop" by Y. LeCun, L. Bottou, G. B. Orr and K. Muller, and published in Springer on 1998. Also, there are many software tools available to train the neural network model such as R and Matlab.

As shown in FIG. 11, in a step S1110, before training the neutral network, features of all the training samples (super-pixels) are normalized. For example, firstly, the mean $\bar{x}$ and standard deviation $\sigma_x$ of the feature vectors on the training set are calculated. Then, for every sample feature $x_i$, i=1, . . . , N the normalization includes the following steps:
1. Standardize with $3*\sigma_x$ and truncate it to $[-1,1]$ $$x_i' = \min\left(\max\left(\frac{x_i - \bar{x}}{3*\sigma_x}, 1\right), -1\right)$$

2. Translate to interval [0.1, 0.9]

$$x_i'' = x_i'*0.4+0.5$$

Wherein, the $x_i''$ is the normalized feature for a training sample.

In a step S1120, the initial model parameter $\theta$ is generated randomly by sampling from the uniform distribution between [−0.15, 0.15].

In the step S1130, the BP algorithm is used to minimize the loss $L(\theta)$, and a current $\theta$ is calculated.

In a step S1140, it is determined that whether the model parameter $\theta$ is converged, namely, whether the difference between the current $\theta$ and the previous $\theta$ is less than a predetermined threshold which is small enough.

If the difference between the current $\theta$ and the previous $\theta$ is not less than the predetermined threshold, the method 1100 returns back to the step S1130; otherwise, the method 1100 proceeds to a step 1150.

In the step 1150, the optimal $\theta^*$ is calculated, and the neural network model is determined. Thus, the classifier is generated.

Figure 12:
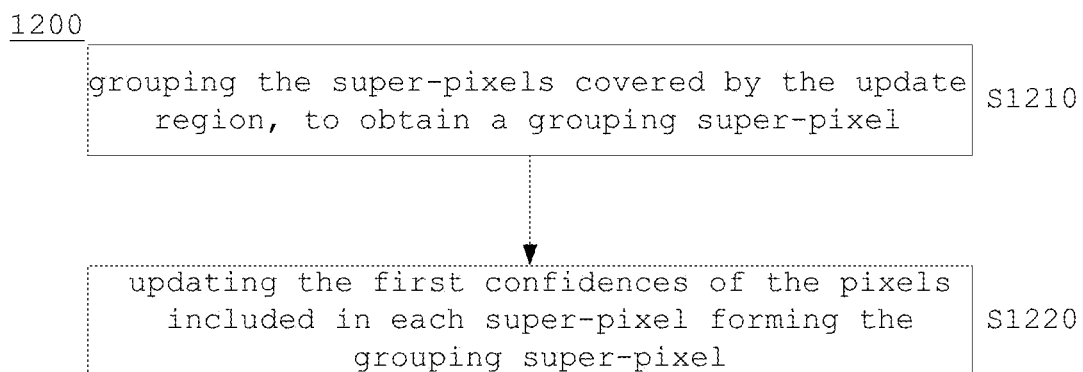
FIG. 12 is a flowchart showing a method for using the classifier trained with the method in FIG. 7 to update first confidences according to an embodiment of the present invention.

When the step S520 involves the classifier trained as above, the step S520 may include a grouping sub-step S1210 and an updating sub-step S1220, as shown in a method 1200 of FIG. 12.

In the grouping sub-step S1210, the super-pixels covered by the update region among a plurality of super-pixels into which the input image is segmented may be grouped, to obtain a grouping super-pixel.

For example, the super-pixels covered by the update region may include a super-pixel which has a ratio of the number of its pixels overlapped with the update region to the total number of its pixels larger than a second predetermined threshold. The second predetermined threshold may be 50%, 60% or other percentage, and thus if the most part of a super-pixel is cover by the update region, the super-pixel will be subjected to be grouped. Each super-pixel covered by the updating region (for example, the extracted foreground region shown in FIG. 6C) can be called a child super-pixel, and all the child super-pixels will be grouped to a single super-pixel called a grouping super-pixel.

Figure 13A:
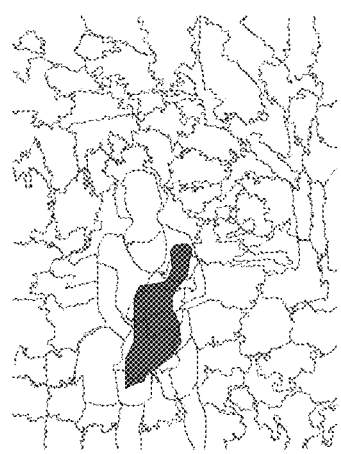
FIGS. 13A and 13B are diagrams showing an example of a foreground region and a grouping super-pixel obtained by grouping child super-pixels covered by the foreground region, respectively.
Figure 13B:
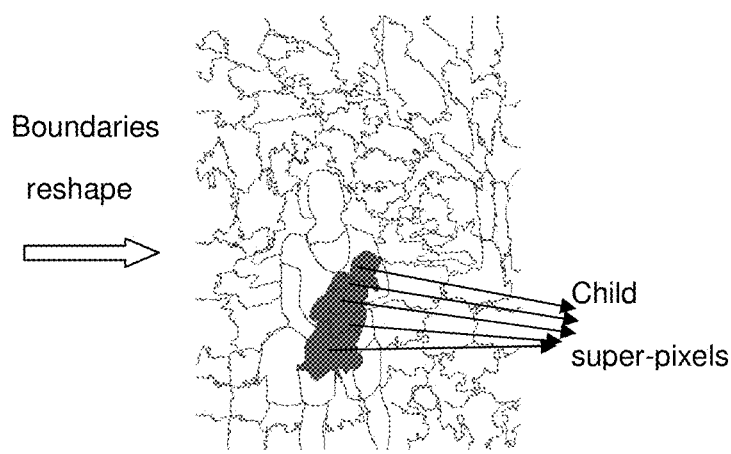

As shown in FIG. 13A and FIG. 13B, they show an updating region (here, foreground region) determined in an input image and a grouping super-pixel obtained by grouping all the child super-pixels covered by the foreground region, respectively. The operation of grouping all the child super-pixels covered by the foreground region is equivalent to reshape the foreground region according to the super-pixel boundaries.

Then, the grouping super-pixel is regarded as a single super-pixel, and input to the improved classifier to be classified.

In the updating sub-step S1220, the first confidences of the pixels included in each super-pixel forming the grouping super-pixel may be updated, according to a confidence of the grouping super-pixel determined by using the classifier.

More specifically, the confidence of the grouping super-pixel can be determined according to features of the grouping super-pixel, by using the classifier trained in the method 700. Then, the first confidence of each pixel in the grouping super-pixel may be updated to the confidence of the grouping super-pixel. The first confidences of pixels in other un-grouped super-pixel remain unchanged.

For example, as shown in FIG. 13B, the features of the grouping super-pixel and the features of other un-grouped super-pixels may be extracted in a form shown in Table 1. Note that, the features of other un-grouped super-pixels may be not necessary. Then, the neural network classifier trained with the method 700 calculates first confidences of super-pixels by using the extracted features. The first confidence of each of those child super-pixels is the same as the first confidence of the grouping super-pixel corresponding to them. The first confidences of other super-pixels which do not belong to any foreground super-pixel remain unchanged.

According to an embodiment of the present invention, the first confidences in the step S210 can be updated not only by the steps S310-S320 but also by the steps S510-S520. The sequence of the steps S310-S320 and the steps S510-S520 are not limited.

Turn back to FIG. 2. In the class determination step S240, the class of each pixel can be determined according to the undated first confidences. More specifically, the updated first confidences may include the first confidences updated in the step S230 and other first confidences determined in the step S210 without being updated in the step S230.

For each pixel, the maximum first confidence after the step S230 may be selected, and used to determine the predetermined class the maximum first confidence corresponds to as the class of the pixel, which can be represented by:

$$L = \arg\max_{k \in \{1, \ldots, K\}} C_k$$

Wherein, L is the maximum first confidence of a pixel after the step S230, and $C_k$ is the first confidence, after the step S230, of the super-pixel belonging to the predetermined class k, k=1, . . . , K. The class label (such as the "human", "nature", and so on) with the maximum first confidence that identifies the corresponding class among the predetermined classes can be assigned to each pixel, and thus each pixel in the input image can be classified. Persons skilled in the art can understand that when a class label is assigned to a super-pixel, pixels in the super-pixel are also assigned with this class label.

After the class of each pixel is determined, further post-processing methods such as removing isolated region are optional to make the class label results smoother.

It is noted that, there is no limitation on the sequence of the steps S210 and S220, as long as the steps S210 and S220 are performed before the step S230.

According to the solutions as described above, by updating the first confidences of pixels according to the detection results, the first confidence can be further influenced and modified, and thus better reflect the real class the corresponding pixel belongs to. With consideration of more information based on the detection results to calculate the confidences of pixels, the pixels can be better classified into their respective real classes. Thus, better classification on pixels can be performed to prevent improper multi-class segmentation, and the classification performance can be improved. Furthermore, with the use of an improved classifier which is trained with consideration of grouping some regions belonging to a particular class in advance, a specific object such as a human body can be considered as a whole to make its global features utilized by the classifier rather than local features of different parts, so as to be able to get better classification results.

Figure 14:
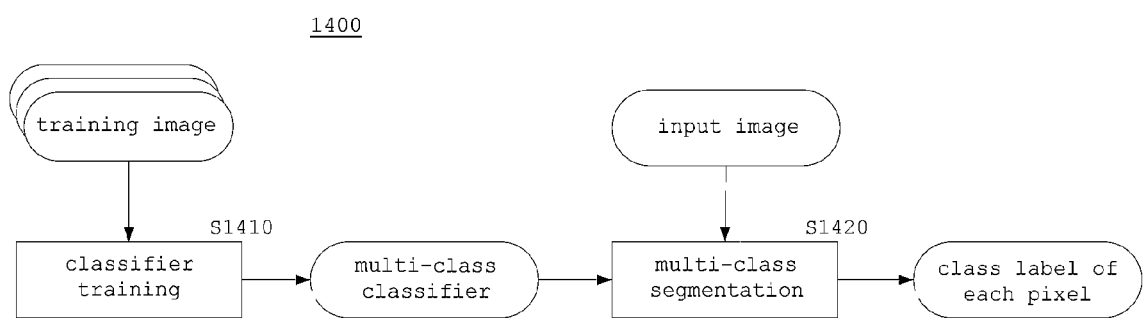
FIG. 14 is an overview showing a method for training a classifier and then using the classifier to classify pixels in an input image according to an embodiment of the present invention.
Figure 15:
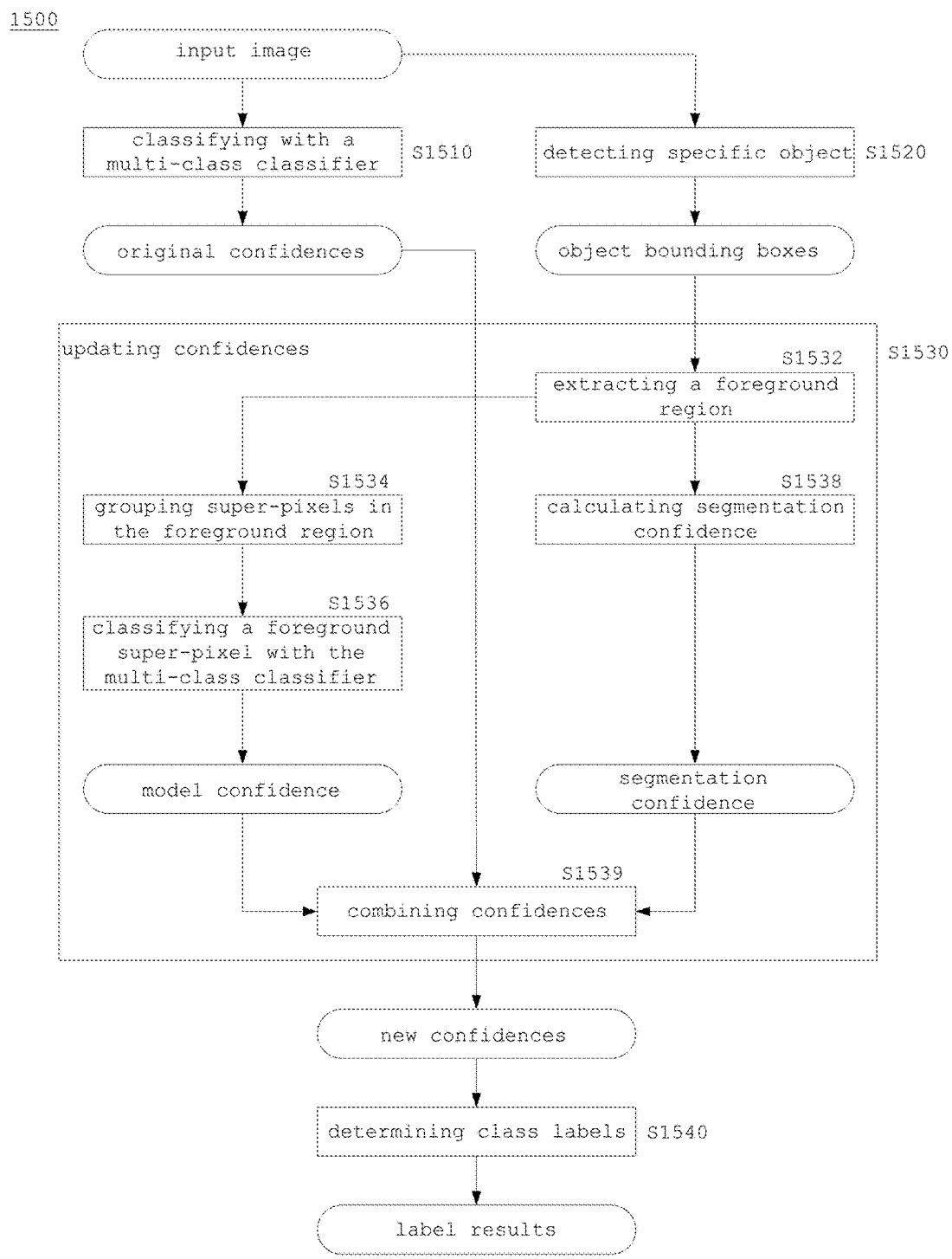
FIG. 15 is a flowchart showing a method for classifying pixels in an input image according to an embodiment of the present invention.

The above has specifically described the details of the method for classifying each pixel in the input image. Next, the flow of the total procedure from the construction of the improved classifier to the classification of each pixel according to an embodiment of the present invention will be illustrated with reference to FIGS. 14 and 15. In FIGS. 14 and 15, a confidence of a pixel is determined based on a confidence of a super-pixel.

As shown in FIG. 14, a multi-class classifier is trained using training images. Then, the multi-class classifier is applied to perform multi-class segmentation of the input image. The total procedure 1400 contains two main parts, a model training step S1410 and a multi-class segmentation step S1420.

In the model training step S1410, the multi-class classifier is trained using samples which are image patches gotten from the training images such as by over-segmentation. The classifier extracts features of each sample (super-pixel) and calculates the confidences of samples belonging to each of the predetermined classes. Then, the classifier predicts the class label of each sample according to its confidences. Usually, the predicted class is the one with the maximum confidence. A loss function is defined to evaluate the loss caused by the difference between the predicted label corresponding to the predicted class and the ground truth label corresponding to the manually marked class. The classifier training course is to minimize the total loss of the entire training set. The classifier training method can refer to the method 700 and correlated description, which will not be described in detail here for avoiding repetition.

In the multi-class segmentation step S1420, multi-class segmentation which will assign one class label to each of pixels/super-pixels in the input image are performed, so as to classify each pixel. A detector which can detect an object belonging to a particular class need to be used in this step to update the confidences obtained from the multi-class classifier, so as to improve the accuracy of classification.

The following flow 1500 shown in FIG. 15 can be used in the step S1420 to determine the class of each pixel, and the specific details can refer to the corresponding content described in conjunction with the methods 200, 300, 500 and 1200, which will not be described in detail here for avoiding repetition.

In a step S1510, the confidence of each pixel belonging to each of predetermined classes is determined using the multi-class classifier trained in the step S1510. Firstly, in the same manner as that in the model training phase, the input image is over-segmented, and the features shown in Table 1 for each super-pixel is extracted. The super-pixel features are normalized as that in the step S1110, and forward propagated through the trained neural network classifier with the structure shown in FIG. 10. The output values for each class are further transformed by a Softmax function to generate the confidence (first confidence) of this super-pixel. The pixel confidence is the same as that of the super-pixel which it belongs to. The confidences generated here are called as the original confidences.

In a step S1520, a specific object is detected using a corresponding object detection algorithm. For example, if there is more than one specific object being a human body in the input image, an existing human detection algorithm can be used to find the bounding boxes which limit human body regions. Here, an existing face detection algorithm can be used to find face bounding boxes, and then the face bounding boxes is enlarged to guess the location of human bodies. More specifically, a face box (rectangle) labels the position of a face, and then a bounding box labels the possible position of a human body according to the face information in the face box. The method to enlarge and compute the human body region is empirical and variable, e.g. using the length-width ratio. With this step, the bounding boxes of specific objects can be generated in the input image.

In a step S1530, the confidences of those super-pixels mainly covered by each bounding box are modified (updated). For each of those super-pixels, the confidence updating steps are performed with steps S1532-S1539.

In the step S1532, the foreground object region within each bounding box is extracted. The image patch within the bounding box is initialized as the foreground region, such as bounding region as shown in FIG. 6B. Then, the Grab Cut algorithm is used to perform binary foreground/background segmentation, to obtain a further foreground region, such as that shown in FIG. 6C.

In the step S1534, a foreground super-pixel within each bounding box is generated. Those child super-pixels belonging to each foreground region are grouped as a new foreground super-pixel. Here, if the most part of a super-pixel is covered by a region, this super-pixel belongs to this region. As shown in FIGS. 13A and 13B, this step is equivalent to reshape the foreground region according to the super-pixel boundaries.

In the step S1536, each foreground super-pixel gotten in the above step S1534 is classified. The features of each foreground super-pixel are extracted, and then a model confidence of each foreground super-pixel is calculated through the neural network classifier obtained in the step S1410 in the same manner as that in the step S1510. The model confidences of those child super-pixels are the same as that of the foreground super-pixel corresponding to them. The model confidences of other super-pixels which don't belong to any foreground super-pixel remain unchanged.

Persons skilled in the art can understand that, if the foreground super-pixel is generated before the step S1510 and thus the step S1510 processes the foreground super-pixel and other un-grouped super-pixels, the step S1534 is not necessary.

In the step S1538, the segmentation confidences (second confidences) of those super-pixels mainly covered by the bounding box are calculated according to the binary segmentation results. With this step, the second confidence of each of the super-pixels covered by the bounding region belonging to the particular class is equal to an average value of probabilities of each pixel in the super-pixel belonging to a foreground of the input image, and the second confidence of each of the super-pixels covered by the bounding region belonging to each of other predetermined classes is equal to an average value of a probability of each pixel included in this super-pixel belonging to each of the other predetermined classes, wherein the probability of the pixel belonging to each of the other predetermined classes is equal to (1−the probability of the pixel belonging to the foreground of the input image)/(the number of the plurality of predetermined classes−1).

In the step S1539, for each super-pixel mainly covered by the bounding box, the model confidence and the segmentation confidence are linearly combined together, so as to update the model confidence. Thus, new confidences are generated for each super-pixel mainly covered by the bounding box, and confidences of other super-pixels not covered by the bounding box remain unchanged to be equal to the original ones.

In a step S1540, the class label of each pixel can be determined according to the model confidence of the super-pixel where the pixel is located. For each super-pixel acquired in the step 1510, each of its pixels can be assigned with a class label corresponding to the maximum component among all components of the model confidence of the super-pixel. Thus, the class of each pixel in the input image can be determined.

In the above methods, as compared to the existing method for classifying pixels, a process for updating confidences by combining the model and segmentation confidences according to specific object detection results of a detector can be used, and an improved multi-class classifier which utilizes discriminative features extracted in the whole regions of the "thing" object can be obtained. Thus, mainly with the above two aspects, an enhanced multi-class segmentation which utilizes object detection results can be performed in a simple and efficient manner.

With the above methods, at least the following technical advantages can be obtained. Firstly, computation cost is lowered. Secondly, as for classification of such as body pixels, the improved multi-class classifier decreases the body false alarm rate due to extracting features in the whole body region. Since the body features are extracted in the whole body, the probability of finding such body features in the non-body super-pixel becomes lower. Thirdly, segmentation-based confidence modification or update is adaptive to "thing" object deformation. The "thing" objects such as a human body and an animal always have a wide variety of articulated poses. Segmentation confidence gotten by the binary segmentation algorithm is more feasible and accuracy than single confidence template which may be learned in advance.

When the above methods are applied to some dataset of images, better performance can be obtained. For example, the Inventors test the proposed method on a dataset which includes 650 training images and 162 test images (162 input images). In the experiments, each pixel is classified into one of the following four classes: sky, green (such as trees and grass), human, and others. Among those four classes, the human belongs to the "thing" class. Existing face and human detectors are used to detect human regions and generate the new confidences.

Each of Table 2 and Table 3 shows a comparison between an existing method and a proposed method with respect to accuracy of pixel classification. The existing method uses a conventional multi-class classifier and does not relate to confidence update. The proposed method uses the proposed improved multi-class classifier and relates to confidence update such as update with both segmentation and model confidences. As for Table 2, the Felzenszwalb over-segmentation method is used, and the extracted features include 69 elements shown in Table 1. As for Table 3, the SLIC over-segmentation method is used, and the extracted features include 225 elements which not only include the above 69 elements but also include more elements about color information and Gabor and LOG filter response features.

From the quantitative results shown in Table 2 and Table 3, it can be clearly seen that, the total pixel accuracy especially the accuracy of the "human" class is improved. The total accuracy is improved only 1.4% because the number of "human" pixels is only 4.78% of the total pixels in the 162 test images.

TABLE 2

|  | Sky | green | human | others | total |
|---|---|---|---|---|---|
| Existing method | 4.7% | 73.8% | 42.8% | 91.8% | 85.7% |
| Proposed method | 5.9% | 74.4% | 65.2% | 91.7% | 87.1% |

TABLE 3

|  | Sky | green | human | others | total |
|---|---|---|---|---|---|
| Existing method | 1.1% | 73.4% | 33.0% | 93.2% | 84.8% |
| Proposed method | 4.4% | 77.3% | 80.1% | 91.5% | 88.1% |

The above two tables clearly shows that, the proposed method can improve the accuracy of classification (especially "human" class) under different segmentation method and features.

The above-described method used for multi-class segmentation or classification usually plays an important role in image understanding. It can be used in many applications such as image retrieval, adaptive image enhancement, robotics and automatic driving. As for the automatic driving, an input image is captured by a camera. Then, multi-class segmentation can be applied to segment and recognize the surrounding scene in the image to determine scene composition, such as getting the road, building and pedestrian's position. Such information is then able to be used to automatically generate correct steering instructions.

Next, an apparatus for classifying pixels in an input image according to an embodiment of the present invention will be described with reference to FIGS. 16 and 17. Each unit in these apparatuses may execute substantially the same operations as the corresponding step in the above methods, and their detailed description will be omitted.

Figure 16:
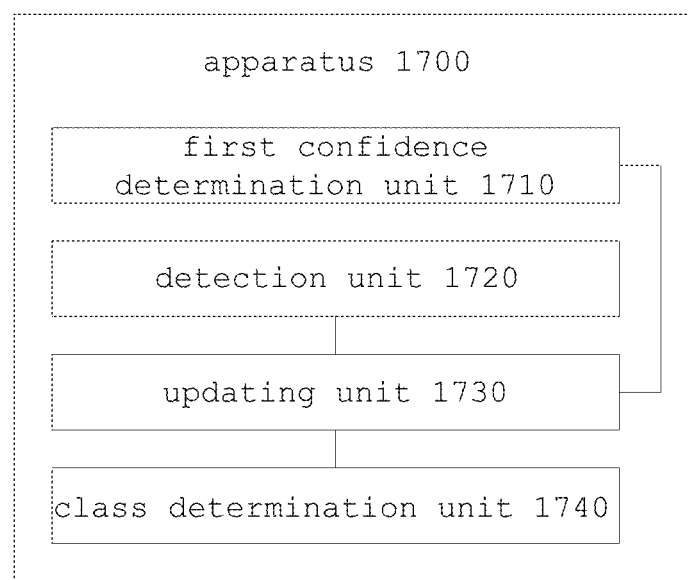
FIG. 16 is a block diagram showing an apparatus for classifying pixels in an input image according to an embodiment of the present invention.

FIG. 16 shows an apparatus 1700 for classifying pixels in an input mage according to an embodiment of the present invention. The apparatus 1700 may comprise a first confidence determination unit 1710, a detection unit 1720, an updating unit 1730 and a class determination unit 1740. The first confidence determination unit 1710 may be configured for determining a first confidence of each of pixels in the input image belonging to each of a plurality of predetermined classes. The detection unit 1720 may be configured for acquiring, by using a detector for detecting a particular class among the plurality of predetermined classes, detection results used to indicate pixels which belong to the particular class. The updating unit 1730 may be configured for updating the first confidences according to the detection results. The class determination unit 1740 may be configured for determining the class to which each of the pixels in the input image belongs among the plurality of predetermined classes, according to the updated first confidences.

For the above-mentioned and other operations and/or functions of these units 1710-1740, the corresponding description about the method 200 can be referenced, and thus these units will not be described in detail herein to avoid repetition.

With the above apparatus, first confidences of pixels can be updated according to detection results acquired by a detector aiming at a particular class, and thus the first confidences of pixels can be further influenced and modified by the detection results of the detector. With consideration of more information based on the detection results to calculate the confidences of the pixels, the pixels can be better classified into their respective real class. Thus, better classification on pixels can be performed to prevent improper multi-class segmentation, and the classification performance can be improved.

Figure 17:
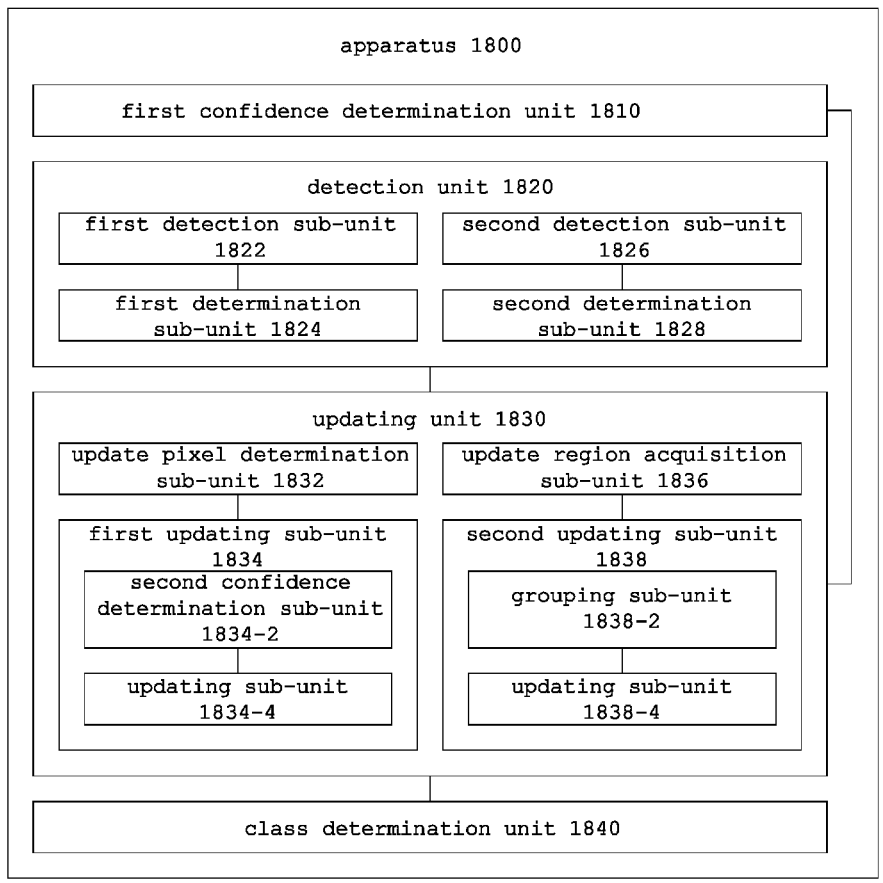
FIG. 17 is a block diagram showing another apparatus for classifying pixels in an input image according to an embodiment of the present invention.

FIG. 17 shows another apparatus 1800 for classifying each pixel in an input image according to an embodiment of the present invention. A first confidence determination unit 1810, a detection unit 1820, an updating unit 1830 and a class determination unit 1840 in the apparatus 1800 may be substantially the same as a first confidence determination unit 1710, a detection unit 1720, an updating unit 1730 and a class determination unit 1740 in the apparatus 1700.

According to an embodiment of the present invention, the updating unit 1830 may comprise an update pixel determination sub-unit 1832 and a first updating sub-unit 1834. The update pixel determination sub-unit 1832 may be configured for determining a plurality of pixels whose first confidences need to be updated, according to the detection results. The first updating sub-unit 1834 may be configured for updating, for each of the plurality of pixels, the first confidence of the pixel according to a probability of this pixel belonging to a foreground of the input image.

According to an embodiment of the present invention, a confidence of a pixel may be determined according to a confidence of a super-pixel where the pixel is located, and super-pixels may be obtained by segmenting the input image. In such a case, the update pixel determination sub-unit 1832 may be further configured for determining pixels included in the super-pixels covered by a region formed of the pixels which belong to the particular class as the pixels whose first confidences need to be updated, and the first updating sub-unit 1834 may comprise a second confidence determination sub-unit 1834-2 and an updating sub-unit 1834-4. The second confidence determination sub-unit 1834-2 may be configured for determining, for each of the super-pixels covered by the region formed of the pixels which belong to the particular class, a second confidence of the super-pixel belonging to each of the plurality of predetermined classes, according to the probabilities of the pixels included in the super-pixel belonging to the foreground of the input image. The updating sub-unit 1834-4 may be configured for updating, for each of the super-pixels covered by the region formed of the pixels which belong to the particular class, the first confidences of the pixels included in the super-pixel according to the second confidence of the super-pixel.

For example, for each of the super-pixels covered by the region formed of the pixels which belong to the particular class, the second confidence of the super-pixel can be determined as follows. The second confidence of the super-pixel belonging to the particular class is equal to an average value of the probability of each pixel included in the super-pixel belonging to the foreground of the input image, and the second confidence of the super-pixel belonging to each of other predetermined classes is equal to an average value of a probability of each pixel included in the super-pixel belonging to the corresponding one of the other predetermined classes, wherein the probability of the pixel belonging to each of the other predetermined classes is equal to (1−the probability of the pixel belonging to the foreground of the input image)/(the number of the plurality of predetermined classes−1).

According to an embodiment of the present invention, the updating sub-unit 1834-4 may be further configured for updating, for each of the pixels included in the super-pixel, the first confidence of the pixel, by linearly combining the second confidence of the super-pixel with the first confidence of the pixel. As for the linear combination, for example, a weight assigned to the second confidence may be larger than a weight assigned to the first confidence.

According to an embodiment of the present invention, the super-pixels covered by the region formed of the pixels which belong to the particular class may include a super-pixel which has a ratio larger than a first predetermined threshold, wherein the ratio may be equal to the number of this super-pixel's pixels overlapped with the region formed of the pixels which belong to the particular class divided by the total number of this super-pixel's pixels.

According to an embodiment of the present invention, the updating unit 1830 may comprise an update region acquisition sub-unit 1836 and a second updating sub-unit 1838. The update region acquisition sub-unit 1836 may be configured for determining, within a region formed of the pixels which belong to the particular class, an update region according to the detection results. The second updating sub-unit 1838 may be configured for classifying the update region as a whole using a classifier, and updating the first confidence of each pixel in the update region according to an output of the classifier. In some embodiments, sub-units 1832-1838 may simultaneously be included in the apparatus 1800.

According to an embodiment of the present invention, the classifier used by the second updating sub-unit 1838 may be trained by a training unit. The training unit may comprise an over-segmentation sub-unit, a grouping sub-unit and a generation sub-unit. The over-segmentation sub-unit may be configured for over-segmenting a training image into a set of regions. The grouping sub-unit may be configured for grouping the regions which belong to the particular class, to obtain a grouping region. The generation sub-unit may be configured for generating the classifier according to features of the grouping region and other un-grouped regions. Note that, the training unit may be included in the apparatus 1800, or may be not included in the apparatus 1800, or may be partially included in the apparatus 1800.

According to an embodiment of the present invention, in the case that a confidence of a pixel is determined according to a confidence of a super-pixel where the pixel is located, the second updating sub-unit 1838 may comprise a grouping sub-unit 1838-2 and an updating sub-unit 1838-4. The grouping sub-unit 1838-2 may be configured for grouping the super-pixels covered by the update region among a plurality of super-pixels into which the input image is segmented, to obtain a grouping super-pixel. The updating sub-unit 1838-4 may be configured for updating the first confidences of the pixels included in each super-pixel forming the grouping super-pixel, according to a confidence of the grouping super-pixel determined by using the classifier.

According to an embodiment of the present invention, the super-pixels covered by the update region may include a super-pixel which has a ratio of the number of its pixels overlapped with the update region to the total number of its pixels larger than a second predetermined threshold.

According to an embodiment of the present invention, the detection unit 1820 may include a first detection sub-unit 1822 and a first determination sub-unit 1824. The first detection sub-unit 1822 may be configured for detecting a plurality of image regions including the pixels which belong to the particular class in the input image by using the detector. The first determination sub-unit 1824 may be configured for determining a region generated by grouping the plurality of image regions as the detecting results.

According to an embodiment of the present invention, the detection unit 1820 may include a second detection sub-unit 1826 and a second determination sub-unit 1828. The second detection sub-unit 1826 may be configured for detecting, in a case that the particular class is a human class, a face region in the input image by using the detector being a face detector. The second determination sub-unit 1828 may be configured for determining a region generated by enlarging the face region as the detection results.

For the above-mentioned and other operations and/or functions of these sub-units 1822 to 1838-4, the corresponding description about the method 200, 300, 500, 700, and 1200 can be referenced, and thus these sub-units will not be described in detail herein to avoid repetition.

With the use of the updating unit, the first confidences of pixels can be updated according to the detection results acquired from the detection unit, and thus the first confidence can be further influenced and modified, so that the real class the corresponding pixel belongs to can be better reflected. With consideration of more information to calculate the confidences of pixels, the pixels can be better classified into their respective real classes. Thus, better classification on pixels can be performed to prevent improper multi-class segmentation, and the classification performance can be improved. Furthermore, in the case that the second updating sub-step uses an improved classifier which is trained by grouping some regions belonging to a particular class in advance, a specific object such as a human body can be considered as a whole to make its global features utilized by the classifier rather than local features of different parts, so as to get better classification results.

Figure 18:
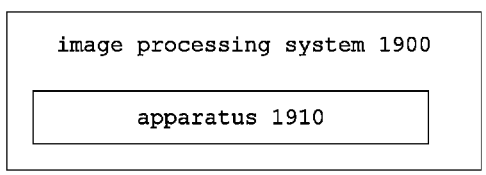
FIG. 18 is a block diagram showing an image processing system according to an embodiment of the present invention.

FIG. 18 shows an image processing system 1900 according to an embodiment of the present invention. The image procession system 1900 may comprise an apparatus 1910 for classifying each pixel in an input image. The classification apparatus 1910 may be the apparatus 1700, or may be the apparatus 1800. The image processing system 1900 can be any device that needs to process an input image to determine the class of each pixel, such as a camera, video camera, personal computer, GPS (global positioning system) navigation device, and other electronic devices. The apparatus 1910 may be implemented by software, hardware or the combination thereof. With the image processing system, better classification results can be obtained.

It is possible to carry out the method and apparatus of the present invention in many ways. For example, it is possible to carry out the method and apparatus of the present invention through software, hardware, firmware, or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. An apparatus to classify pixels in an input image, the apparatus comprising:
   at least one processing unit coupled to a memory;
   a first confidence determination unit configured to determine a first confidence of each pixel in the pixels of the input image that represents a probability that a given pixel belongs to a particular class, wherein each pixel belongs to each of a plurality of predetermined classes;
   a detection unit configured to acquire, by using a detector to detect a particular class for a pixel among the plurality of predetermined classes, detection results used as an indication of the particular class to which each pixel in the input image belongs among the plurality of predetermined classes;
   an updating unit configured to update the first confidences according to the acquired detection results of the detector; and
   a class determination unit configured to determine, according to the updated first confidences, the class to which each pixel in the input image belongs among the plurality of predetermined classes,
   wherein at least one of the first confidence determination unit, the detection unit, the updating unit, and the class determination unit are implemented by the at least one processing unit.

2. The apparatus according to claim 1, wherein the updating unit includes:
   an update pixel determination sub-unit configured to determine a plurality of pixels whose first confidences need to be updated, according to the detection results, and
   a first updating sub-unit configured to update, for each of the plurality of pixels, the first confidence of the pixel according to a probability of this pixel belonging to a foreground of the input image.

3. The apparatus according to claim 2,
   wherein super-pixels are obtained by segmenting the input image and a confidence of a pixel is determined according to a confidence of a super-pixel where the pixel is located,
   wherein the update pixel determination sub-unit further is configured to determine pixels included in the super-pixels covered by a region formed of the pixels which belong to the particular class as the pixels whose first confidences need to be updated, and
   wherein the first updating sub-unit includes:
   a second confidence determination sub-unit configured to determine, for each of the super-pixels covered by the region formed of the pixels which belong to the particular class, a second confidence of the super-pixel belonging to each of the plurality of predetermined classes, according to the probabilities of the pixels included in the super-pixel belonging to the foreground of the input image, and
   an updating confidence sub-unit configured to update, for each of the super-pixels covered by the region formed of the pixels which belong to the particular class, the first confidences of the pixels included in the super-pixel according to the second confidence of the super-pixel.

4. The apparatus according to claim 3,
   wherein, for each of the super-pixels covered by the region formed of the pixels which belong to the particular class, the second confidence of the super-pixel belonging to the particular class is equal to an average value of the probability of each pixel included in the super-pixel belonging to the foreground of the input image, and the second confidence of the super-pixel belonging to each of other predetermined classes is equal to an average value of a probability of each pixel included in the super-pixel belonging to the corresponding one of the other predetermined classes, and
   wherein the probability of the pixel belonging to each of the other predetermined classes is equal to (1−the probability of the pixel belonging to the foreground of the input image)/(the number of the plurality of predetermined classes−1).

5. The apparatus according to claim 3, wherein the updating confidence sub-unit further is configured to update, for each of the pixels included in the super-pixel, the first confidence of the pixel, by linearly combining the second confidence of the super-pixel with the first confidence of the pixel.

6. The apparatus according to claim 5, wherein a weight assigned to the second confidence is larger than a weight assigned to the first confidence.

7. The apparatus according to claim 3, wherein the super-pixels covered by the region formed of the pixels which belong to the particular class include a super-pixel which has a ratio larger than a first predetermined threshold, wherein the ratio is equal to the number of this super-pixel's pixels overlapped with the region formed of the pixels which belong to the particular class divided by the total number of this super-pixel's pixels.

8. The apparatus according to claim 1, wherein the updating unit includes:
   an update region acquisition sub-unit configured to determine, within a region formed of the pixels which belong to the particular class, an update region according to the detection result, and
   a second updating sub-unit configured to classify the update region as a whole using a classifier, and to update the first confidence of each pixel in the update region according to an output of the classifier.

9. The apparatus according to claim 8, wherein the classifier is trained by a training unit, wherein the training unit includes:
   an over-segmentation sub-unit configured to over segment a training image into a set of regions,
   a grouping sub-unit configured to group the regions which belong to the particular class, to obtain a grouping region, and
   a generation sub-unit configured to generate the classifier according to features of the grouping region and other un-grouped regions.

10. The apparatus according to claim 9,
   wherein super-pixels are obtained by segmenting the input image and a confidence of a pixel is determined according to a confidence of a super-pixel where the pixel is located, and,
   wherein the second updating sub-unit includes:
   a grouping sub-unit configured to obtain a grouping super-pixel by grouping the super-pixels covered by the update region among a plurality of super-pixels into which the input image is segmented, and
   an updating grouping sub-unit configured to update the first confidences of the pixels included in each super-pixel forming the grouping super-pixel, according to a confidence of the grouping super-pixel determined by using the classifier.

11. The apparatus according to claim 10, wherein the super-pixels covered by the update region include a super-pixel which has a ratio of the number of its pixels overlapped with the update region to the total number of its pixels larger than a second predetermined threshold.

12. The apparatus according to claim 1, wherein the detection unit includes:
a first detection sub-unit configured to detect a plurality of image regions including the pixels which belong to the particular class in the input image by using the detector, and
a first determination sub-unit configured to determine a region generated by grouping the plurality of image regions as the detecting results.

13. The apparatus according to claim 1, wherein the detection unit includes:
a second detection sub-unit configured to detect, in a case that the particular class is a human class, a face region in the input image by using the detector being a face detector, and
a second determination sub-unit configured to determine a region generated by enlarging the face region as the detection results.

14. An image processing system, comprising:
the apparatus according to claim 1.

15. A method for an apparatus to classify pixels in an input image, the method comprising:
determining a first confidence of each pixel in the pixels of the input image that represents a probability that a given pixel belongs to a particular class, wherein each pixel belongs to each of a plurality of predetermined classes;
acquiring, by using a detector to detect a particular class for a pixel among the plurality of predetermined classes, detection results used as an indication of the particular class to which each pixel in the input image belongs among the plurality of predetermined classes;
updating, using at least one processing unit coupled to a memory, the first confidences according to the acquired detection results of the detector; and
determining, according to the updated first confidences, the class to which each pixel in the input image belongs among the plurality of predetermined classes.

16. The image processing system according to claim 14, further comprising at least one interface.

17. The apparatus according to claim 1, wherein the detector is an object detector and is one of a human detector, an animal detector, and a face detector.

18. The apparatus according to claim 1,
wherein the plurality of predetermined classes includes four classes of sky, human, others, and green, where the green class includes trees and grass,
wherein the first confidence of a first pixel is constituted by four probabilities, one for each class, and
wherein the predetermined object is one of a thing or stuff, wherein a thing has a distinct size and shape that can be localized by a bounding box that can limit the region where the thing appears, and wherein stuff is a homogeneous or reoccurring pattern of fine-scale properties with no specific spatial extent or shape capable of being localized by a bounding box.

19. A non-transitory recording medium storing a computer-readable program to cause an apparatus to perform a method to classify pixels in an input image, the method comprising:
determining a first confidence of each pixel in the pixels of the input image that represents a probability that a given pixel belongs to a particular class, wherein each pixel belongs to each of a plurality of predetermined classes;
acquiring, by using a detector to detect a particular class for a pixel among the plurality of predetermined classes, detection results used as an indication of the particular class to which each pixel in the input image belongs among the plurality of predetermined classes;
updating, using at least one processing unit coupled to a memory, the first confidences according to the acquired detection results of the detector; and
determining, according to the updated first confidences, the class to which each pixel in the input image belongs among the plurality of predetermined classes.

20. The apparatus according to claim 1, further comprising a generation unit implemented by the at least one processing unit and configured to generate a segmented image of the input image for display on a display unit,
wherein the generation unit positions each classified pixel within a distinct region recognizable by the apparatus as a predetermined object based on the determined classification.

* * * * *